United States Patent [19]
Takahashi et al.

[11] Patent Number: 5,642,208
[45] Date of Patent: Jun. 24, 1997

[54] IMAGE FORMING SYSTEM

[75] Inventors: Hiroyuki Takahashi; Mitsuru Kurita; Toshiyuki Kitamura, all of Yokohama, Japan

[73] Assignee: Canon Kabushiki Kaisha, Tokyo, Japan

[21] Appl. No.: 344,596

[22] Filed: Nov. 18, 1994

[30] Foreign Application Priority Data

Nov. 22, 1993 [JP] Japan .................. 5-292233

[51] Int. Cl.⁶ .................. H04N 1/46
[52] U.S. Cl. .................. 358/501; 358/515; 395/114; 395/115
[58] Field of Search .................. 358/515, 500, 358/501, 502, 503, 524, 527, 400, 401, 402, 403, 404, 444, 442, 468, 296; 382/166, 167; 395/114, 115, 116, 164, 166; 355/202

[56] References Cited

U.S. PATENT DOCUMENTS

| | | | |
|---|---|---|---|
| 4,004,277 | 1/1977 | Gavril | 395/843 |
| 4,476,486 | 10/1984 | Ayata et al. | 358/501 |
| 4,564,864 | 1/1986 | Maeshima | 358/444 |
| 4,791,492 | 12/1988 | Nagashima et al. | 358/409 |
| 4,853,767 | 8/1989 | Sakai et al. | 358/524 |
| 4,866,532 | 9/1989 | Ayata et al. | 358/443 |
| 5,021,876 | 6/1991 | Kurita et al. | 358/530 |
| 5,040,031 | 8/1991 | Hayashi | 355/326 R |
| 5,043,918 | 8/1991 | Murahashi | 395/115 |
| 5,079,625 | 1/1992 | Kitamura et al. | 358/537 |
| 5,165,072 | 11/1992 | Kurita et al. | 358/448 |
| 5,168,292 | 12/1992 | Kadowaki et al. | 395/116 |
| 5,187,593 | 2/1993 | Kurita et al. | 358/434 |
| 5,214,772 | 5/1993 | Weinberger et al. | 355/202 |
| 5,260,777 | 11/1993 | Komine et al. | 358/500 |
| 5,287,194 | 2/1994 | Lobiondo | 395/114 |
| 5,296,936 | 3/1994 | Pittas et al. | 358/404 |
| 5,400,153 | 3/1995 | Schonenberg et al. | 358/515 |
| 5,428,464 | 6/1995 | Silverbrook | 358/501 |
| 5,446,839 | 8/1995 | Deq | 395/163 |
| 5,467,434 | 11/1995 | Hower, Jr. et al. | 395/112 |

Primary Examiner—Edward L. Coles, Sr.
Assistant Examiner—Fan Lee
Attorney, Agent, or Firm—Fitzpatrick, Cella, Harper & Scinto

[57] ABSTRACT

An image forming system includes a plurality of sequentially connected image forming apparatuses, each of which stores image data in a storage unit, and forms an image by reading out the stored image data. The image forming system also includes at least an apparatus for storing input image data into a memory after compressing the information amount of the data, and forming an image by reading out the compressed image data from the memory. A predetermined one of the image forming apparatuses includes an input unit for inputting color-separated image data of each different color, a storage unit for storing the color-separated image data without compressing the information amount of the data, and an output unit which is capable of outputting the color-separated image data of each different color in a frame-sequential manner from the storage unit, and which is capable of outputting the color-separated image data of each different color in parallel. This arrangement results in the memory capacity of the entire system being decreased while maintaining a high copy volume.

8 Claims, 20 Drawing Sheets

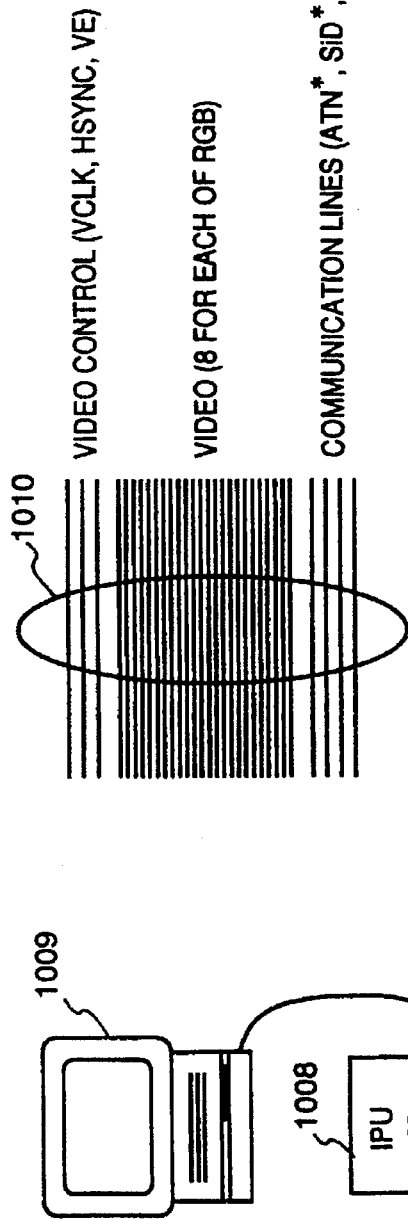
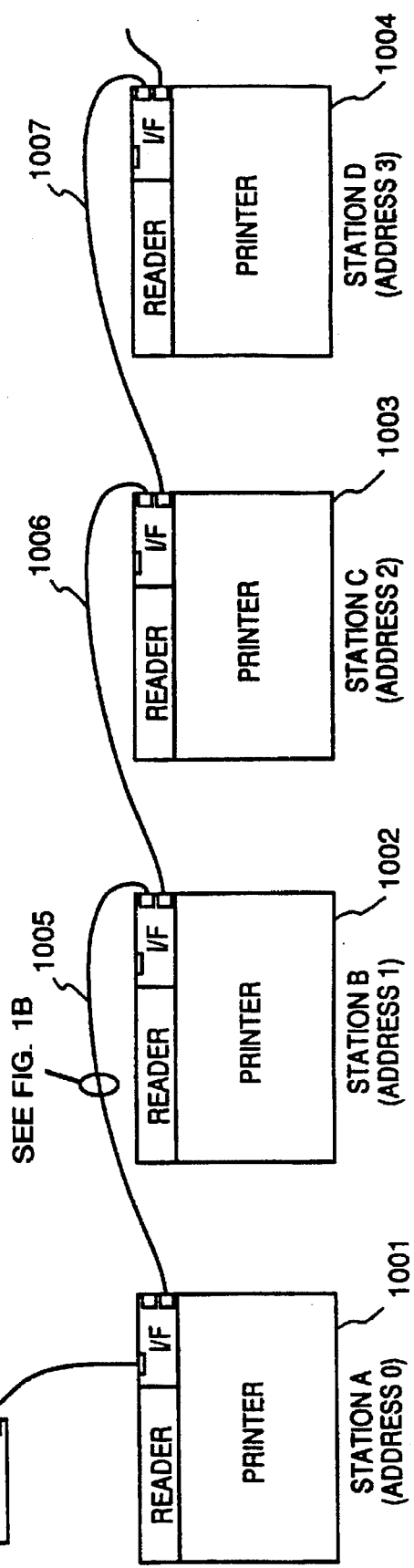
FIG. 1A
FIG. 1B

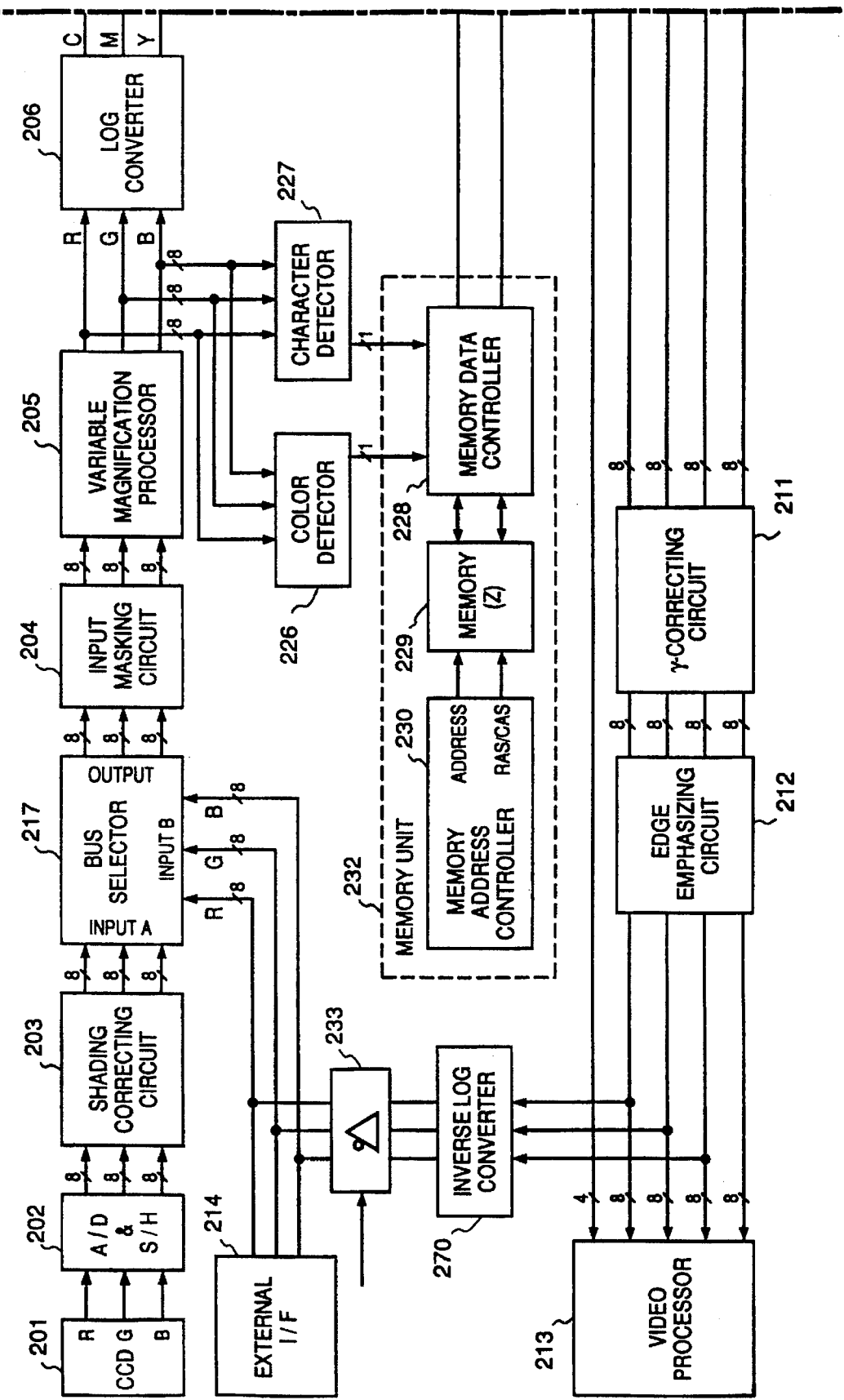

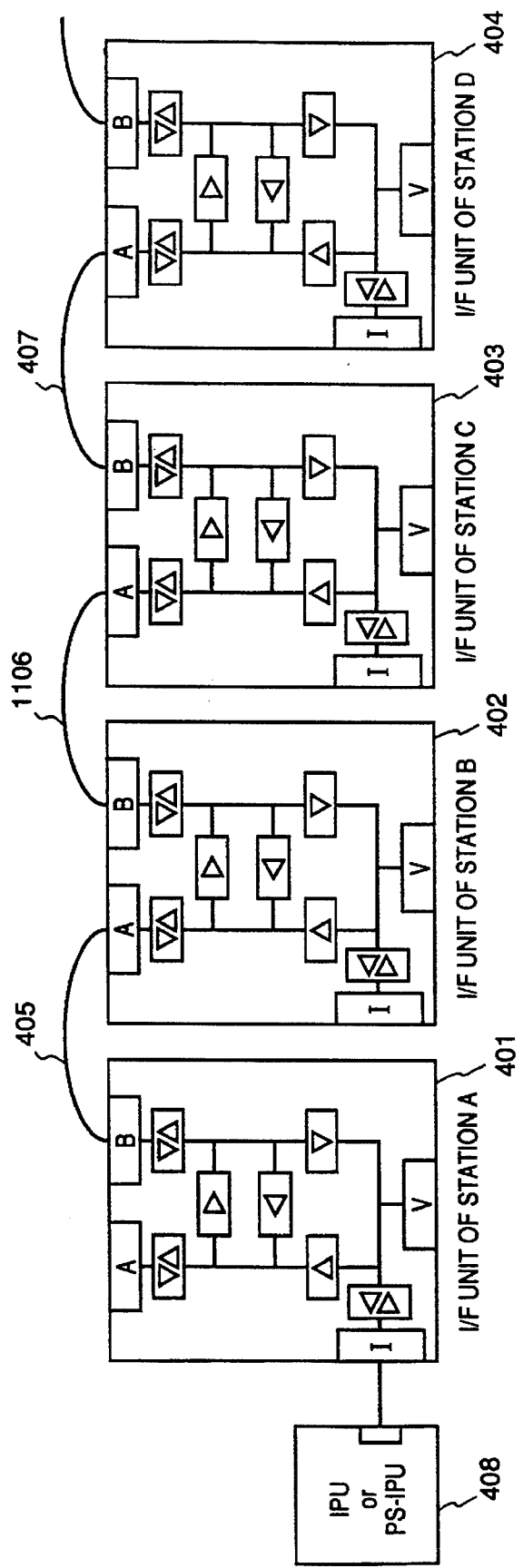

FIG. 6

| CODE | COMMAND | CONTENTS |
|---|---|---|
| 10 | INTERFACE CLEAR | ISSUED BY MASTER STATION AFTER INITIALIZATION OF ITSELF UPON TURNING ON OF POWER SUPPLY |
| 01 | PRINT START | ISSUED BY IMAGE TRANSFER SOURCE CONTAINING ADDRESS OF START REQUEST SOURCE, ADDRESS OF START REQUEST DESTINATION, AND COPY QUANTITY |
| 03 | STATUS REQUEST | ISSUED BY MASTER STATION AT PREDETERMINED INTERVALS CONTAINING REQUEST DESTINATION ADDRESS |
| 05 | STATUS TRANSFER | SLAVE STATION ISSUES THIS COMMAND WITHIN A PREDETERMINED TIME PERIOD IN RESPONSE TO STATUS REQUEST ISSUED BY MASTER STATION CONTAINING ADDRESS OF SELF-STATION FOLLOWED BY PRINTER STATUS AND PRESENCE/ABSENCE OF ERROR |
| 06 | IMAGE TRANSFER END | ISSUED BY IMAGE TRANSFER SOURCE AFTER END OF IMAGE TRANSFER |
| 09 | IMAGE TRANSFER FORM | DESIGNATE FRAME-SEQUENTIAL DATA TRANSFER OR 3-COLOR PARALLEL TRANSFER, OR DESIGNATE TRANSFER COLOR IN FRAME-SEQUENTIAL DATA TRANSFER |

ROT = 000

ROT = 001

ROT = 010

ROT = 011

ROT = 100

ROT = 101

ROT = 110

ROT = 111

FIG. 13B

VIDEO CONTROL (VCLK, HSYNC, VE)

VIDEO (8 FOR EACH OF RGB)

COMMUNICATION LINES (ATN*, SID*, DACK*, OFFER*)

FIG. 13A

IMAGE FORMING SYSTEM

BACKGROUND OF THE INVENTION

Field of the Invention

The present invention relates to an image forming system in which a plurality of image forming apparatuses are connected to each other to form images simultaneously.

Image forming apparatuses incorporating a page memory are conventionally known.

A digital copying machine is considered as an apparatus of this type. A reader and a printer which constitute a digital copying machine may be independently used as an image reading device and an image output device, respectively. Therefore, a system has been proposed in which a reader/printer is used as an image I/O apparatus by connecting it to a general purpose computer system by using an external I/F apparatus. In another proposed system, a plurality of pairs of readers and printers are separately connected, and a central control means is provided for controlling them. In this system, a high copy volume (CV) is ensured by the simultaneous use of the printers.

In these systems, a page memory is an essential component to increase the speed of image output, and it is a natural trend to transfer images from an external device such as a computer as discussed above and store them in a memory for subsequent output. However, the difference between transfer schemes for image data (especially color-separated image data) is not taken into consideration.

In addition, since each apparatus of a single system has its own page memory, the memory capacity of the entire system is significantly increased.

If the memory capacity of each apparatus is decreased, however, it becomes necessary to supply image data each time an individual apparatus forms an image. This makes it impossible to maintain a high CV within a short period of time.

SUMMARY OF THE INVENTION

It is an object of the present invention to solve the above conventional problems.

It is another object of the present invention to decrease the memory capacity of an entire system while maintaining a high CV.

In order to achieve the above objects, according to one aspect of the present invention, there is provided an image forming system constituted by sequentially connecting a plurality of image forming apparatuses each for storing image data in storage means and forming an image by reading out the stored image data, comprising:

at least an apparatus for storing input image data into storage means after compressing an information amount of the data, and forming an image by reading out the compressed image data from the storage means, wherein a predetermined one of the image forming apparatuses comprises:
(a) input means for inputting color-separated image data of each different color;
(b) storage means for storing the color-separated image data of each different color without compressing an information amount of the data; and
(c) output means capable of outputting the color-separated image data of each different color in a frame-sequential manner from the storage means and capable of outputting the color-separated image data of each different color in parallel from the storage means.

According to another aspect of the present invention, there is provided an image forming system constituted by sequentially connecting a plurality of image forming apparatuses each for storing image data in storage means and forming an image by reading out the stored image data, wherein a predetermined one of the image forming apparatuses comprises:
(a) input means capable of inputting color-separated image data of each different color in a frame-sequential manner and capable of inputting the color-separated image data of each different color in parallel;
(b) storage means for storing the input image data from the input means; and
(c) compressing means for compressing an information amount of the image data from the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a view showing an arrangement of a tandem system according to one embodiment of the present invention;

FIGS. 3A and 3B are block diagrams showing the arrangement of an image processing unit of a reader unit of the apparatus in FIG. 2;

FIG. 4 is a view showing the state of connections of video signals in an I/F unit of the tandem system;

FIG. 6 is a view for explaining main commands for communications in the tandem system;

FIG. 13 is a view showing the arrangement of a tandem system according to another embodiment of the present invention;

DETAILED DESCRIPTION OF THE PREFERRED EMBODIMENTS

Figure 2:
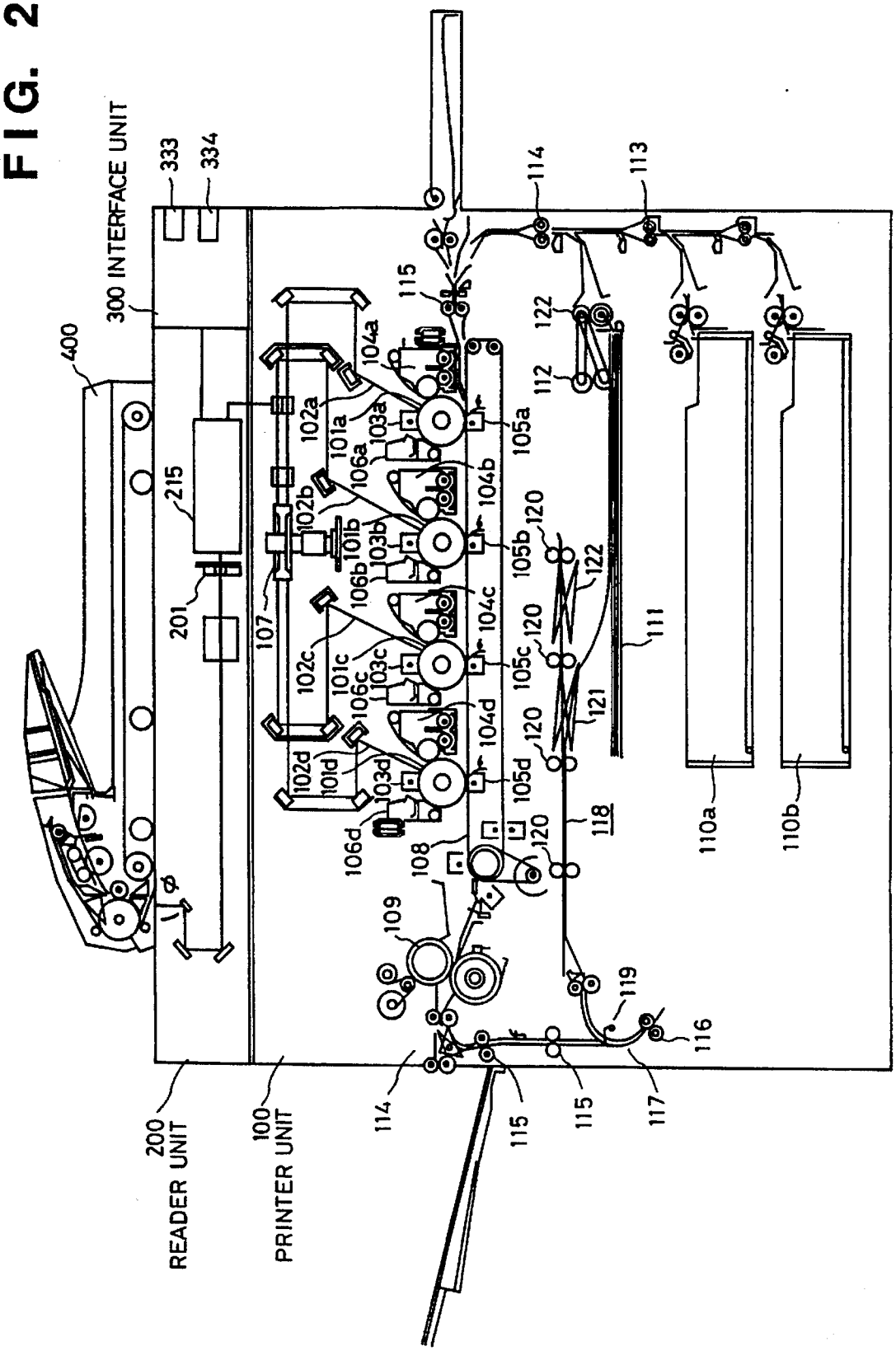
FIG. 2 is a view showing an image forming apparatus according to the embodiment of the present invention.

One embodiment of the present invention will be described in detail below with reference to the accompanying drawings.

Recently, digital copying machines incorporating a full-page memory for storing read image data are increasingly used as the speed of digital copying machines has increased. In a digital copying machine of this type, read image data is temporarily stored in a page memory and read out as output image data. Therefore, the timing of image read and write operations are more flexible than those of copying machines having a general configuration.

In the present invention, a digital copying machine as described above has a function of receiving control signals for writing image data in a page memory from outside the copying machine, and also has a means of switching input and output, together with image signals, from the copying machine. This allows each copying machine to store image signals generated by other copying machines in its page memory in addition to self generated image signals. Consequently, it is possible to construct a system (to be referred to as a "tandem system" hereinafter) with a flexible expandability, in which the number of apparatuses constituting the system are changed in accordance with a necessary CV.

FIG. 1 shows the arrangement of a system of one embodiment according to the present invention. In this embodiment, each image forming apparatus is constituted by a digital copying machine.

In FIG. 1, each of reference numerals 1001 to 1004 denotes a digital copying machine set (to be referred to as a "station" hereinafter). Each station has a system address. It is necessary that the system addresses of these stations connected in a tandem system be different from one another and that address "0" be always present. In addition, the connecting order of the system addresses is determined to switch video signals.

In this embodiment the station of address 0 is arranged at one end of the system, and the other stations are connected from that station in increasing order of system addresses. Reference numerals 1005 to 1007 denote cables for connections in the tandem system. As shown in FIG. 1, each cable 1010 includes a total of 24 video signal lines, i.e., eight lines for each of colors R, G, and B (or C, M, and Y), three video control lines, and four serial communication lines. An interface device 1008 connects these digital copying machines with a general computer 1009.

The arrangement of each station is described below with reference to FIGS. 2, 3A and 3B in an order of a reader unit 200, a printer unit 100, and an interface unit 300.

In the reader unit 200 in FIG. 2, an original is optically read by a CCD sensor 201 and is electronically processed by an image processing unit 215. The resulting signal is transferred to the printer unit 100. The arrangement of the image processing unit 215 is illustrated in the block diagram of FIGS. 3A and 3B.

In the image processing unit 215, the CCD sensor 201 is provided with filters of three colors R, G, and B for reading an original image. An analog-to-digital converting and sample-and-hold (to be referred to as A/D & S/H hereinafter) circuit 202 converts the image data into digital data. After being corrected by a shading correcting circuit 203, the image data is corrected by an input masking circuit 204 through a bus selector 217. In a variable magnification mode, a variable magnification processor 205 performs variable magnification processing. The RGB data are converted into CMY data by a LOG converter 206 and stored in a memory unit 208. Subsequently, a masking•UCR circuit 210 performs masking in response to the read timing synchronized with each of colors C, M, Y, and K. Thereafter, a γ-correcting circuit 211 and an edge emphasizing circuit 212 form CMYK output image data. The image is then recorded on recording paper by the printer 100 via a video processor 213.

An external I/F 214 exchanges image data with other stations via the interface unit 300 or receives data from the interface device 1008.

The schematic arrangement of the printer unit 100 in this embodiment is described below with reference to FIG. 2. FIG. 2 illustrates the arrangement of an image forming apparatus capable of forming full-color images by using toners of four colors, i.e., magenta, cyan, yellow, and black. This apparatus has four image forming stations independently provided for magenta, cyan, yellow, and black. These stations have photosensitive drums 101a to 101d as image carriers. The surfaces of the photosensitive drums 101a to 101d are evenly charged by primary high-voltage chargers and grid high-voltage units 103a to 103d. After this even charging, on the basis of image information of the four colors scanned by a laser optical system 107, laser scanning systems 102a to 102d form electrostatic latent images oh the photosensitive drums by exposing images corresponding to the four colors. The latent images corresponding to the image information of the four colors are developed into toner images by developing devices 104a to 104d having toners of magenta, cyan, yellow, and black. The toner images are then transferred onto a transfer medium conveyed by a conveyor belt 108 as a transfer medium conveying means by transfer chargers 105a to 105d. The residual toners on the photosensitive drums are removed by cleaning devices 106a to 106d.

A double-side image formation sequence in this embodiment is described below by taking the case in which a transfer medium is fed from an upper cassette as an example.

A first paper feed roller solenoid (not shown) is turned on simultaneously with ON of an image formation start signal to start feeding transfer media P stacked in a paper feed cassette 110a. Each transfer medium P fed from the cassette is conveyed by conveyor register rollers 113 and 114. When the leading end of the transfer medium P abuts against a first register roller 115, a predetermined loop is formed to cause the conveyance to pause.

Meanwhile, an original placed on a platen is read by the CCD sensor 201 at the same time the image formation start signal is turned on, and the read image signal is transmitted to the image processing unit 215. After laser scan for the image data read in the image memory of the image processing unit 215 is made possible, driving of the first register roller 115 is started. By this driving, the transfer medium P is attracted to a predetermined position on the conveyor belt and conveyed by the belt to perform image formation. As described above, images of the four colors are transferred to the transfer medium P. In this case, the image information of the original stored in the memory is written on the photosensitive drums of the four colors by the laser optical system 107, such that the images of the four colors overlap on the transfer medium P at the timing at which the transfer medium P passes through the four stations of magenta, cyan, yellow, and black. The transfer medium P which passes through the four stations and on which the images are so transferred as to overlap each other is conveyed to a fixing means 109 for fixing the toner images. The fixing means 109 then fixes the toner images formed on the transfer medium P.

In copying of the upper surface, a paper refeed roller release solenoid (not shown) is turned on simultaneously with ON of the image formation start signal to raise a paper refeed roller 112, thereby preparing for double-side image formation. A paper conveyance path deflecting plate solenoid (not shown) is also turned on to operate a first paper deflecting plate 114, forming a paper conveyance path for double-side image formation. At the same time, in accordance with the paper size, a paper stopper plate solenoid SL (not shown) in an intermediate tray unit 118 is turned on to operate a paper stopper plate (not shown) in the intermediate tray.

Simultaneously, a second conveyor unit driving solenoid SL (not shown) is turned on to start driving of a second conveyor unit, i.e., a pair of rollers 115.

When the fixing of the first side is completed, the transfer medium P is conveyed to the conveyor rollers 115 through the double-side path by the first paper deflecting plate 114. When the transfer medium P passes by a paper reversal sensor 119 provided in a switch-back unit (paper reversal unit) 117, a reverse-driving solenoid SL5 (not shown) is turned on to rotate reversible rollers 116 in the reverse direction. Consequently, the transfer medium P is switched back to a second conveyor unit (conveyor rollers 120). Reference numerals 121 and 122 denote deflecting plates corresponding to different paper sizes. When paper deflecting plate solenoids SL7 and SL8 (not shown) are driven in accordance with the size of the transfer medium P the deflecting plates 121 and 122 change the conveyance paths of the transfer medium P which is conveyed into the intermediate tray When the first transfer medium P is conveyed into the intermediate tray, the paper refeed roller release solenoid (not shown) is turned off to move the rotating paper refeed roller 112 down on the transfer medium P. Consequently, the conveyed transfer medium P abuts against the paper stopper plate (not shown). This allows a tray paper sensor (not shown) to reliably sense the copying paper.

The transfer media on the first sides of which image formation is performed by the above series of operations are stacked in an intermediate tray 111 and set in a standby state to prepare for image formation on the second sides.

In this state, the second paper feed roller 112 is kept moving down on the transfer media stacked in the tray. When an image formation start signal for the second sides is generated in this state, a second-side image formation operation is started. That is, the second conveyor unit driving solenoid (not shown) is turned on to rotate the paper refeed roller 112, refeeding the top one of the transfer media P stacked in the tray. When the first transfer medium starts to be fed, i.e., starts to be conveyed by conveyor rollers 122, the second paper feed roller moves upward. When the feed of the first transfer medium is completed, the rotating second paper feed roller is moved down at a predetermined timing to start feeding the next (second) transfer medium. The paper refeed roller 112 is thus repeatedly moved up and down. The transfer medium thus refed is conveyed by conveyor rollers 114. When the leading end of the transfer medium abuts against the first register roller pair, a predetermined loop is formed to cause the conveyance to pause. Thereafter, as in the first-side image formation, the transfer medium is fixed on and conveyed by the conveying means 108 to pass through the first to fourth stations, forming the second-side image. The second-side image is then fixed. Meanwhile, when the second-side image formation is started, the first paper deflecting plate solenoid (not shown) discussed above is turned off. Therefore, the transfer media on which the second-side image is formed and fixed are guided to paper delivery rollers and delivered to and stacked on a paper delivery tray. After the last transfer medium is delivered, the series of operations are completed.

Figure 3B:
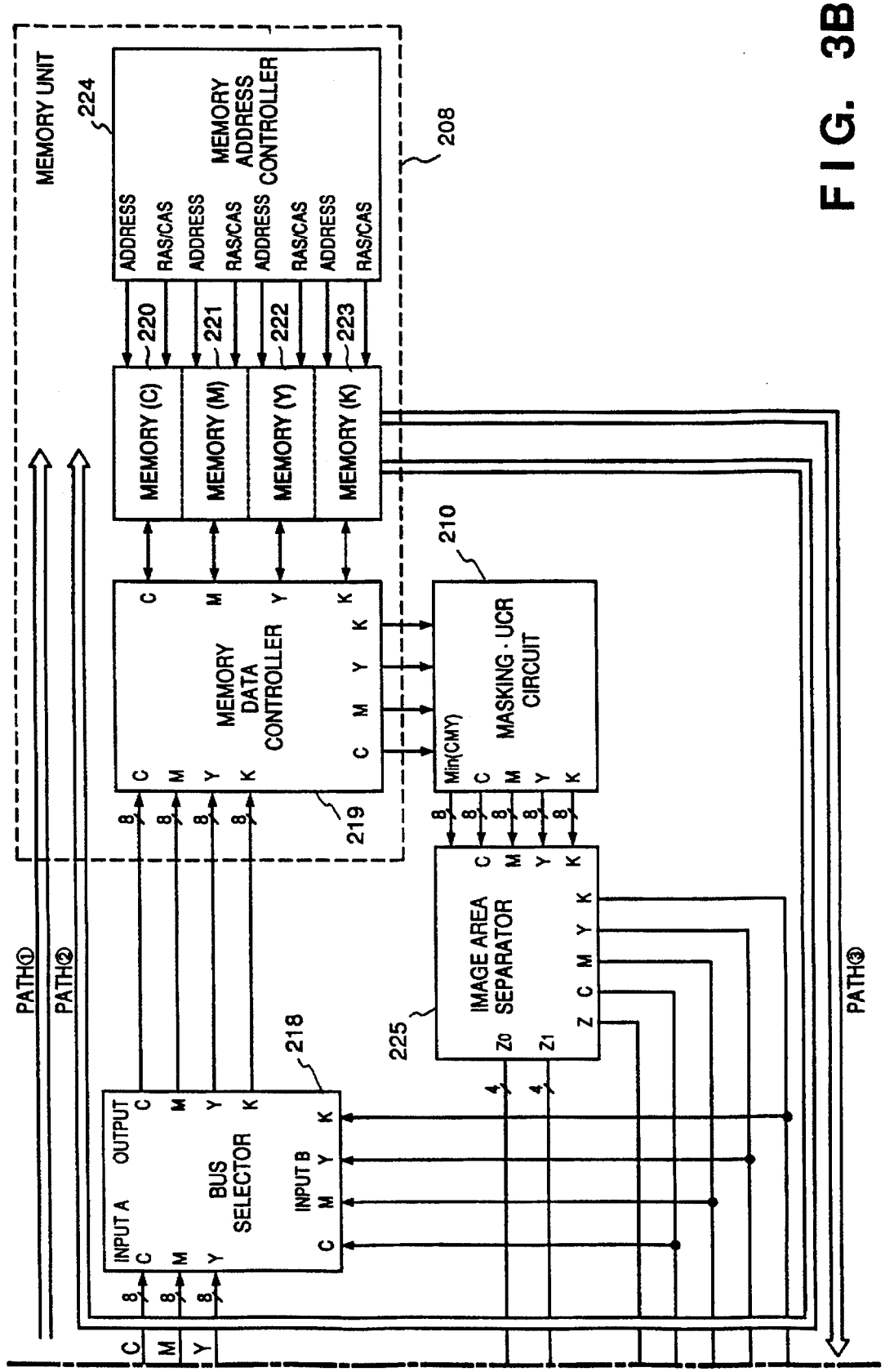

The interface unit 300 is connected to an external input I/F unit 214 shown in FIGS. 3A and 3B. The interface unit 300 performs communications for outputting image information read by the reader unit 200 to external equipment through an external input terminal 333 and an external output terminal 334 or for causing the printer unit 100 to print out input image information from the external input terminal 333.

FIG. 4 shows the state of connections of video signals in the system with the above arrangement.

Referring to FIG. 4, reference numerals 1101 to 1104 denote only the interface units (I/F units) of the stations 1001 to 1004 in FIG. 1.

Figure 5:
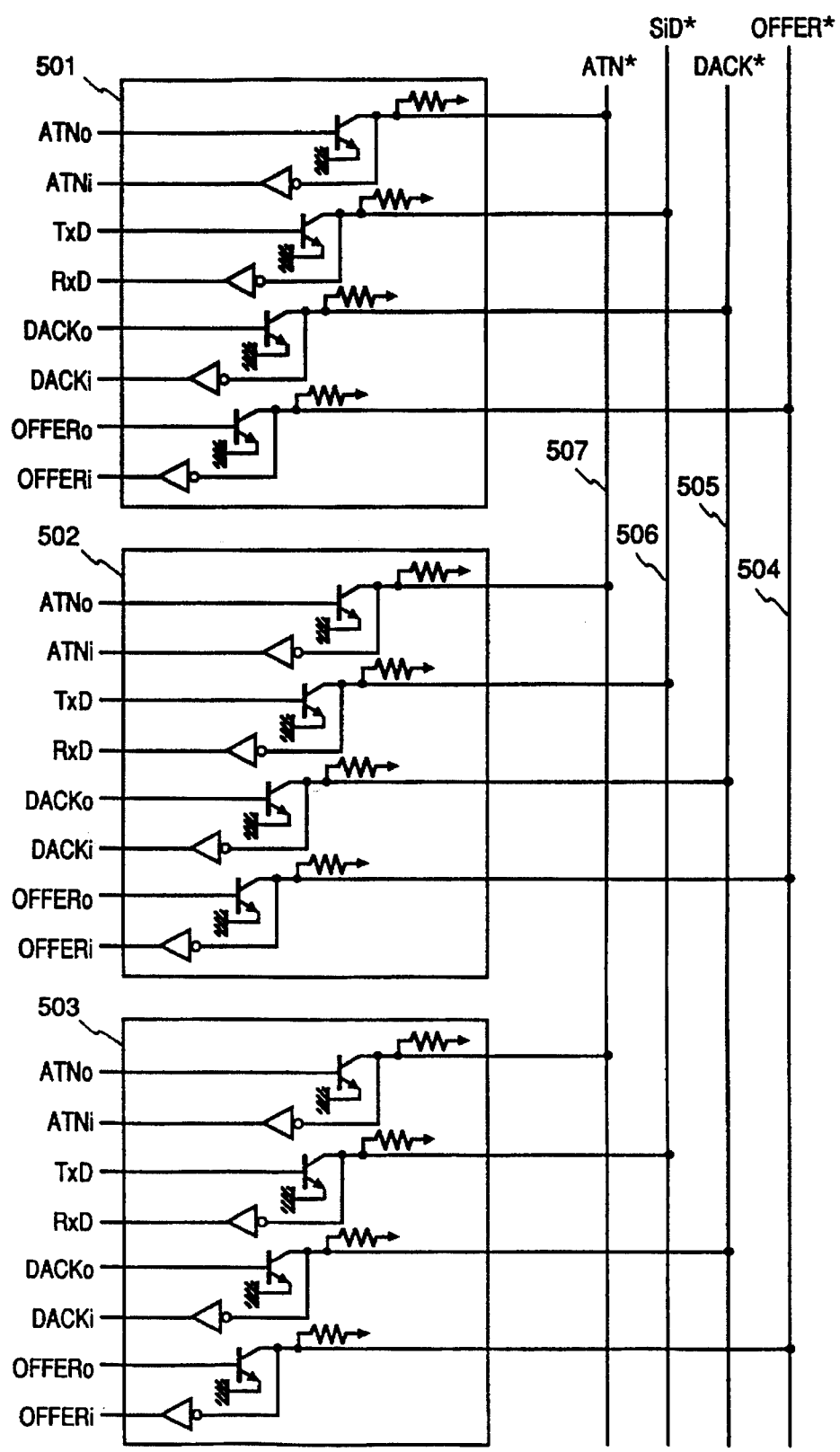
FIG. 5 is a view showing the state of connections of communication lines in the I/F unit of the tandem system.

As discussed earlier, in this embodiment the relationship between contacts (1 and 2 in each I/F unit) with other stations and the system addresses is that a station with a lower address than that of the self-station is connected to the contact 1 and a station with a higher address than that of the self-station is connected to the contact 2. Note in passing that no problem arises even if the system addresses are not consecutive provided that the above relationship is established. FIG. 5 shows the detailed connected state of the cables 1005 to 1007 (serial communication lines) in the individual I/F units in FIG. 4.

Referring to FIG. 5, reference numerals 1201 to 1203 denote only the interface units 1101 to 1103 of the stations 1001 of 1003 in FIG. 4. There are four signal lines ATN* (1207), SiD* (1206), DACK* (1205), and OFFER* (1204) for serial communications.

ATN* is a sync signal which indicates that data is being transferred from a master station (defined as a station with system address 0) in the tandem system. In stations (to be referred to as "slave stations" hereinafter) other than the master station, the ATN* lines are normally ON.

OFFER* is a signal which is defined as OFFER*=1 (high level) when each slave station transmits data to the master station. OFFER* is normally ON in the master station. OFFER* is connected by wired OR between a plurality of slave stations. DACK* is a signal which represents that a data reception side has completed data reception, and is connected by a wired OR between stations. Therefore, if a plurality of stations are reception sides, DACK* on the line is rendered inactive when the station which has completed data reception last renders DACK* inactive. In this manner, data transmissions/receptions between stations are synchronized.

SiD* is bidirectional serial data which is exchanged in synchronism with ATN* (master→slave) and OFFER* (slave→master). The data transfer method is a half-duplex start-stop synchronization method. The transfer rate, the data format, and the like are preset when the system is activated.

Eight signal lines extend from each interface unit (1201 to 1203) to the controller of the corresponding station. TxD and RxD are connected to the transmission and reception of serial communications, ATNo, DACKo, and OFFERo are connected to the I/O ports on the input side, and ATNi, DACKi, and OFFERi are connected to the I/P ports on the output side.

When the tandem system illustrated in FIG. 1 is constructed using interfaces with the above arrangement according to this embodiment, communications are performed through the cables 1005 to 1007 as serial signal lines. FIG. 6 shows principal commands used in the communications.

In FIG. 6, an interface clear command (code "10") is used to reset parameters related to the tandem system. The master station which is defined to have system address "0" issues this interface clear command and fixes OFFER* as the input when initialization of the self-station is completed. Upon receiving the command, each slave station fixes ANT* as the input and initializes internal parameters.

A status request command (code "03") is a command for collecting information such as the status of each slave connected to the tandem system. The status request command is issued to each slave when a predetermined time elapses after the master station has issued the interface clear command. This command includes a request destination address for designating a slave as a parameter.

A status transfer command (code "05") is a command by which a slave designated by the status request command reports its status to the other stations of the tandem system. When designated by the master station, a slave station must issue this command within a predetermined time period. This command includes parameters such as those indicating the address of the self-station and the presence/absence of errors, various flags indicating, e.g., a waiting state and a copying state, and other parameters indicating, e.g., the presence/absence of paper.

If a slave which is designated by the status request command from the master station does not issue the status transfer command within a predetermined time, the master station determines that the designated slave is not connected in the tandem system.

A print start command (code "01") is a command which designates stations to be used by a station which is to transfer images, and designates distribution of copy quantities to the stations to be used, thereby causing these stations to prepare for image reception. This command includes an image transfer source address, a request destination address, and a copy quantity as parameters.

An image transfer end command (code "06") is used by an image transfer source station to report the end of image transfer to the other stations.

An image transfer form command (code "09") is used to designate frame-sequential data transfer or three-color simultaneous transfer as a transfer form, or to designate a transfer color in the frame-sequential data transfer.

Figure 7:
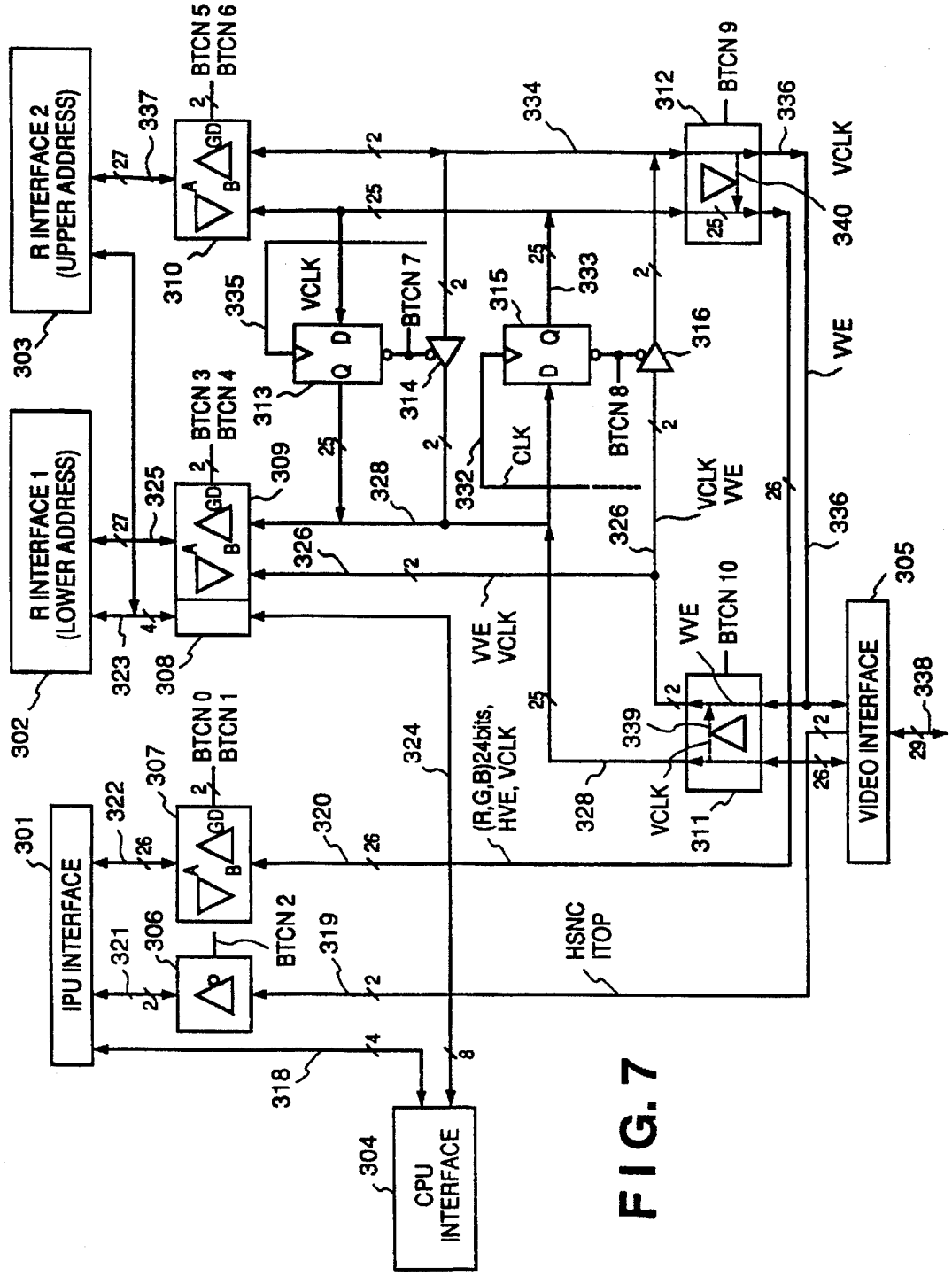
FIG. 7 is a block diagram showing the detailed arrangement of the I/F unit in FIG. 4.

The detailed arrangement of each of the I/F units 1101 to 1104 in FIG. 4 is illustrated in FIG. 7. Note that FIG. 7 also shows the flows of video and sync signals in individual modes.

Each of the I/F units 1101 to 1104 in FIG. 7 includes an interface 301 (IPU interface) connected to a memory unit (IPU) in addition to the interfaces explained below.

That is, each I/F unit is constituted by the interface 301 connected to the memory unit (IPU), an interface 302 (R interface 1) and an interface 303 (R interface 2) connected to other apparatuses (copying machines), a CPU interface 304 for communicating with other host apparatuses, and an interface 305 (video interface) connected to the main body.

In this embodiment, each I/F unit also includes tristate buffers 306, 311, 312, 314, and 316, bidirectional buffers 307, 309, and 310, a special bidirectional buffer 308 with a function of converting 8-bit data into 4-bit data, and D-flip-flops 313 and 315 with a tristate function.

Reference symbols BTCN0 to BTCN10 denote I/O ports which are set by a CPU (not shown). Reference numeral 318 denotes a communication line (4 bits) connected between the IPU and the main body; 319, a main-scan sync signal HSNC and a subscan sync signal ITOP; 320, a 26-bit signal consisting of three 8-bit video signals+image clock+main-scan enable signal HVE; 321, a signal identical with the signal 319; 322, a signal identical with the signal 320; 324, an 8-bit signal as a communication line connected to another apparatus (copying machine); and 323, a 4-bit signal as a communication line connected to another apparatus (copying machine). The communication lines 323 and 324 are described later.

A signal 325 is a combination of a signal 326 (2 bits) and a signal 328 (25 bits). The signal 326 is a 2-bit (336 and one bit of 320) signal consisting of an image clock and a subscan video enable signal VVE. The signal 328 is a 25-bit signal consisting of three video signals+HVE. Reference numeral 332 denotes an image clock (one bit of 326); 333, a 25-bit signal consisting of three video signals+HVE; 334, a 2-bit signal consisting of an image clock VCLK and the subscan enable signal VVE; 335, an image clock (one bit of 335) signal; 337, a combination signal of the signals 333 and 334; 336, VVE; and 338, a 29-bit signal consisting of the signal 320 (26 bits), HSNC, VVE, and ITOP.

Reference numerals 339 and 340 denote lines onto which one bit of VCLK is separated from the 2-bit signal.

The control of the I/O ports and the flow of signals in each mode is described below.

In this arrangement, the tristate buffers 306, 311, 312, 314, and 316 are enabled when control signals (BTCN2, BTCN10, BTCN9, BTCN7, and BTCN8) applied to them are LOW "0", and are set in a high-impedance state when these control signals are HIGH "1". The bidirectional buffers 307, 309, and 310 are realized by elements such as "LS245". The data flow changes in accordance with control signals (BTCN0 and BTCN1, BTCN3 and BTCN4, and BTCN5 and BTCN6) applied to the terminals G and D of the bidirectional buffers 307, 309, and 310. That is, the data flow is B→A when the terminal G is LOW "0" and the terminal D is LOW "0"; the data flow is A→B when the terminal G is LOW "0" and the terminal D is HIGH "1"; and no data flows in either direction (an isolation state) when the terminal G is HIGH "1". The D-flip-flops 313 and 315 are enabled when enable signals (BTCN7 and BTCN8) are LOW "0", and are set in a high-impedance state when the enable signals are HIGH "1" These D-flip-flops function to synchronize the timing of the video clock with the timing of HYNC, HVE, and the video signal at all times during an output operation to other stations.

In the tandem system of this embodiment, the IPU 1008 and the stations 1001 to 1004 are connected as illustrated in FIG. 1. Since the stations 1001 to 1004 have the same arrangement, each station can be assigned the function of either a master station or a slave station. To allow transfer or transmission/reception of image video data between these stations regardless of which station is assigned which function, these stations have the data transmission/reception transfer modes described below.

The following explanation of the modes is made by focusing attention on one given station. Therefore, this station will be called a "self-apparatus", and a term "self-apparatus relay" is used when this "self-apparatus" does not load data but merely relays, i.e., transfers the data to another station and/or the IPU. In addition, each station having a smaller address value than that of the self-apparatus will be called a "lower-address apparatus", and each station having a larger address value will be called an "upper-address apparatus".

Mode 1: IPU→self-apparatus relay→lower-address apparatus
Mode 2: IPU→self-apparatus relay→upper-address apparatus
Mode 3: IPU→self-apparatus
Mode 4: Lower-address apparatus→self-apparatus relay→upper-address apparatus
Mode 5: Lower-address apparatus→self-apparatus
Mode 6: Upper-address apparatus→self-apparatus relay→lower-address apparatus
Mode 7: Upper-address apparatus→self-apparatus
Mode 8: Self-apparatus→IPU
Mode 9: Self-apparatus→lower-address apparatus
Mode 10: Self-apparatus→upper-address apparatus
Mode 11: IPU→self-apparatus relay→upper- and lower-address apparatuses
Mode 12: IPU→self-apparatus and self-apparatus relay→lower-address apparatus
Mode 13: IPU→self-apparatus and self-apparatus relay→upper-address apparatus
Mode 14: IPU→self-apparatus and self-apparatus relay→upper- and lower-address apparatuses
Mode 15: Lower-address apparatus→self-apparatus and self-apparatus relay→upper-address apparatus
Mode 16: Upper-address apparatus→self-apparatus and self-apparatus relay→lower-address apparatus
Mode 17: Self-apparatus→IPU and lower-address apparatus
Mode 18: Self-apparatus→IPU and upper-address apparatus
Mode 19: Self-apparatus→upper- and lower-address apparatuses
Mode 20: Self-apparatus→IPU and upper- and lower-address apparatuses Note that the interface 301 is used in the data transmission/reception and relay with the IPU 1008, the interface 302 is used in the data transmission/reception and relay with a lower-address apparatus, and the interface 303 is used in the data transmission/reception and relay with an upper-address apparatus.

As discussed above, each station has a function of relaying data to an upper-address station and/or a lower-address station. Therefore, when a certain station is to transfer data to a station with a distant address value, the data is transferred as is, and is relayed by intermediate stations between the two stations. That is, in actual data transfer each station need only perform data transmission/reception with two stations, each having the immediately adjacent address value, and with the IPU, regardless of the number of stations connected. Therefore, it is only necessary for each station to have a function of transmitting/receiving data with respect to a maximum of three transfer destinations (or transfer sources).

The digital copying machine of this embodiment has the data transmission/reception and relay modes as described above. Therefore, the number of data transfer destinations (or transfer sources) of each station (digital copying machine) is limited to a maximum of 3 regardless of the number of stations connected to the tandem system. This makes data transfer possible regardless of the number of stations connected, provided that this digital copying machine is used as each station and the stations are connected as depicted in FIGS. 1 and 2.

The states of the control signals BTCN0 to BTCN10 from the CPU in the individual modes is described below.

The control of the I/O ports and the signal flow in the individual modes in the arrangement in FIG. 7 is described below.

[Transfer from IPU interface to R interface 1 (mode 1)]
BTCN0←"1" (high level)
BTCN1←"0" (low level)
BTCN2←"0" (low level)
BTCN3←"0" (low level)
BTCN4←"0" (low level)
BTCN5←X
BTCN6←X
BTCN7←"1" (high level)
BTCN8←X
BTCN9←"1" (high level)
BTCN10←"0" (low level)

Although X means "don't care", it is assumed that signals are so controlled as not to interfere with each other.

The signal flows are: signal line 338→signal line 329→signal line 321 (the route of HSNC and ITOP from the video interface 305 to the IPU interface 301); signal line 322→signal line 320→signal line 328→signal line 325 (the route of the image signal (24 bits) and HVE from the IPU interface 301 to the R interface 1); and signal line 338 (VVE)→signal line 336 (VVE)+signal line 339 (VCLK)→signal line 326→signal line 325 (the route of VCLK and VVE from the video interface 305 to the R interface 1).

That is, in this embodiment, in transmitting the image data (R, G, and B, a total of 24 bits) from the IPU interface 301 to an apparatus assigned an upper address, the clock VCLK is input via the IPU interface, and VVE is output from the self-apparatus to the upper-address apparatus.

This is so because the entire system is so constructed that the self-apparatus serves as a so-called master apparatus to control the other apparatuses.

[Transfer from IPU interface to R interface 2 (mode 2)]
BTCN0←"1" (high level)
BTCN1←"0" (low level)
BTCN2←"0" (low level)
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 319→signal line 321; signal line 322→signal line 320→signal line 328→signal line 333→signal line 337; and signal line 338→signal line 336+signal line 339→signal line 326→signal line 334→signal line 337.

[Transfer from IPU interface to video interface (mode 3)]
BTCN0←"1" (high level)
BTCN1←"0" (low level)
BTCN2←"0" (low level)
BTCN3←X
BTCN4←X
BTCN5←X
BTCN6←X
BTCN7←X
BTCN8←X
BTCN9←"1" (high level)
BNCN10←"0" (low level)

The signal flows are: signal line 338→signal line 319→signal flow 321; and signal line 322→signal line 339→signal line 338.

[Transfer from R interface 1 to R interface 2 (mode 4)]
BTCN0←X
BTCN1←X
BTCN2←X

BTCN3←"1" (high level)
BTCN4←"0" (low level)
BTCN5←"0" (low level)
BTCN6←"0" (low level)
BTCN7←"1" (high level)
BTCN8←"0" (low level)
BTCN9←X
BNCN10←"1" (high level)

The signal flows are: signal line 325→signal line 328→signal line 333→signal line 337; and signal line 325→signal line 326→signal line 334→signal line 337.

[Transfer from R interface 1 to video interface (mode 5)]
BTCN0←X
BTCN1←"1" (high level)
BTCN2←X
BTCN3←"1" (high level)
BTCN4←"0" (low level)
BTCN5←X
BTCN6←"1" (high level)
BTCN7←"1" (high level)
BTCN8←"0" (low level)
BTCN9←X
BNCN10←"1" (high level)

The signal flows are: signal line 325→signal line 328+signal line 326→signal line 333+signal line 334→signal line 320→signal line 338; and signal line 325→signal line 326→signal line 334→signal line 336→signal line 338.

[Transfer from R interface 2 to video interface (mode 6)]
BTCN0←X
BTCN1←X
BTCN2←X
BTCN3←"0" (low level)
BTCN4←"0" (low level)
BTCN5←"1" (high level)
BTCN6←"0" (low level)
BTCN7←"0" (low level)
BTCN8←"1" (high level)
BTCN9←X
BNCN10←"1" (high level)

The signal flows are: signal line 337→signal line 333→signal line 328→signal line 325; and signal line 337→signal line 334→signal line 326→signal line 325.

[Transfer from R interface 2 to video interface (mode 7)]
BTCN0←X
BTCN1←"1" (high level)
BTCN2←X
BTCN3←X
BTCN4←X
BTCN5←"1" (high level)
BTCN6←"0" (low level)
BTCN7←X
BTCN8←"1" (high level)
BTCN9←"0" (low level)
BNCN10←X The signal flows are: signal line 337→signal line 333+signal line 334→signal line 320→signal line 338; and signal line 337→signal line 334→signal line 336→signal line 338.

[Transfer from video interface to IPU interface (mode 8)]
BTCN0←"0" (low level)
BTCN1←"0" (low level)
BTCN2←"0" (low level)
BTCN3←X
BTCN4←X
BTCN5←X
BTCN6←X
BTCN7←X
BTCN8←X
BTCN9←"1" (high level)
BNCN10←X The signal flows are: signal line 338→signal line 320→signal line 322; and signal line 338→signal line 319→signal line 321.

[Transfer from video interface to R interface 1 (mode 9)]
BTCN0←X
BTCN1←"1" (high level)
BTCN2←X
BTCN3←"0" (low level)
BTCN4←"0" (low level)
BTCN5←X
BTCN6←X
BTCN7←"0" (low level)
BTCN8→X
BTCN9←"1" (high level)
BNCN10←"0" (low level)

The signal flows are: signal line 338→signal line 320→signal line 328→signal line 325; and signal line 338→signal line 336+signal line 339→signal line 326→signal line 325.

[Transfer from video interface to R interface 2 (mode 10)]
BTCN0←X
BTCN1←"1" (high level)
BTCN2←X
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 320→signal line 328→signal line 333→signal line 337; and signal line 338→signal line 336+signal line 339→signal line 326→signal line 334→signal line 337.

[Mode 1+mode 2 (mode 11)]
BTCN0←"1" (high level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 319→signal line 321; signal line 322→signal line 320→signal line 328→signal line 325; signal line 322→signal line 320→signal line 328→signal line 333→signal line 337; signal line 338→signal line 336+signal line 320→signal line 326→signal line 325; and signal line 338→signal line 336+signal line 339→signal line 326→signal line 334→signal line 337.

[Mode 1+mode 3 (mode 12)]
BTCN0←"1" (high level)
BTCN1←"0" (low level)
BTCN2←"0" (low level)
BTCN3←"0" (low level)
BTCN4←"0" (low level)
BTCN5←X
BTCN6←"1" (high level)
BTCN7←"1" (high level)
BTCN8←X BTCN9←"1" (high level)
BNCN10←"0" (low level)

The signal flows are: signal line 338→signal line 319→signal line 321; signal line 322→signal line 320→signal line 328; signal line 322→signal line 320→signal line 328→signal line 325; and signal line 338→signal line 336+signal line 339→signal line 326→signal line 325.

[Mode 2+mode 3 (mode 13)]
BTCN1←"0" (low level)
BTCN2←"0" (low level)
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 319→signal line 321; signal line 322→signal line 320→signal line 338; signal line 322→signal line 320→signal line 328→signal line 333→signal line 337; and signal line 338→signal line 336+signal line 339→signal line 336→signal line 334→signal line 337.

[Mode 1+mode 2+mode 3 (mode 14)]
BTCN0←"1" (high level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 319→signal line 321 (the route for outputting ITOP and HSNC from the video interface 305 to the IPU interface 301); signal line 322→signal line 320→signal line 338 (the route for inputting 24-bit video data, HVE, and VCLK from the IPU interface 301 to the video interface 305); signal line 322→signal line 328→signal line 325 (the route for inputting 24-bit video data, HVE, and VCLK from the IPU interface 301 to the R interface 302); signal line 322→signal line 320→signal line 328→signal line 333→signal line 337 (the route for inputting 24-bit video data, HVE, and VCLK from the IPU interface 301 to the R interface 303); signal line 338 (VVE)→signal line 336 (VVE)+signal line 339 (VCLK)→signal line 326 (VVE, VCLK)→signal line 325 (the route for outputting VCLK from the IPU interface 301 and VVE from the video interface 305 to the R interface 302); and signal line 338→signal line 336+signal line 320→signal line 326→signal line 334→signal line 337 (the route for outputting VCLK from the IPU interface 301 and VVE from the video interface 305 to the upper-address interface 303).

Since this embodiment uses the circuit illustrated in FIG. 7 which operates in this mode 14, the input image data from the IPU interface 301 can be simultaneously transferred to the self-apparatus and the other image forming apparatuses.

[Mode 4+mode 5 (mode 15)]
BTCN0←X
BTCN1←X
BTCN2←"1" (high level)
BTCN3←"1" (high level)
BTCN4←"0" (low level)
BTCN5←"0" (low level)
BTCN6←"0" (low level)
BTCN7←"1" (high level)
BTCN8←"0" (low level)
BTCN9←"0" (low level)
BNCN10←"1" (high level)

The signal flows are: signal line 325→signal line 328→signal line 333→signal line 337; signal line 325→signal line 326→signal line 334→signal line 337; signal line 325→signal line 326+signal line 328→signal line 334+signal line 333→signal line 320→signal line 338; and signal line 325→signal line 326→signal line 334→signal line 336→signal line 338.

[Mode 6+mode 7 (mode 16)]
BTCN0←X
BTCN1←"1" (high level)
BTCN2←X
BTCN3←"0" (low level)
BTCN4←"0" (low level)
BTCN5←"1" (high level)
BTCN6←"0" (low level)
BTCN7←"0" (low level)
BTCN8←"1" (high level)
BTCN9←X
BNCN10←"1" (high level)

The signal flows are: signal line 337→signal line 333→signal line 328→signal line 325; signal line 337→signal line 334→signal line 336→signal line 325; signal line 337→signal line 333+signal line 324→signal line 320→signal line 338; and signal line 337→signal line 334→signal line 336→signal line 338.

[Mode 8+mode 9 (mode 17)]
BTCN0←"0" (low level)
BTCN1←"0" (low level)
BTCN2←"0" (low level)
BTCN3←"0" (low level)
BTCN4←"0" (low level)
BTCN5←X
BTCN6←X
BTCN7←"1" (high level)
BTCN8←X
BTCN9←"1" (high level)
BNCN10←"0" (low level)

The signal flows are: signal line 338→signal line 319→signal line 321; signal line 338→signal line 328→signal line 325; and signal line 338→signal line 320+signal line 339→signal line 326→signal line 325.

[Mode 8+mode 10 (mode 18)]
BTCN0←"0" (low level)
BTCN1←"0" (low level)
BTCN2←"0" (low level)
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 319→signal line 321; signal line 338→signal line 320→signal line 322; signal line 338→signal line 328→signal line 333→signal line 337; and signal line 338→signal line 320+signal line 339→signal line 326→signal line 334→signal line 310.

[Mode 9+mode 10 (mode 19)]
BTCN0←X
BTCN1←"1" (high level)
BTCN2←X
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 328→signal line 325; signal line 338→signal line 328→signal line 333→signal line 337; signal line 338→signal line 320+signal line 336→signal line 326→signal line 325; and signal line 338→signal line 320+signal line 339→signal line 326→signal line 334→signal line 337.

[Mode 8+mode 9+mode 10 (mode 20)]
BTCN0←"0" (low level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BNCN10←"0" (low level)

The signal flows are: signal line 338→signal line 319→signal line 321; signal line 338→signal line 320→signal line 322; signal line 338→signal line 328→signal line 325; signal line 338→signal line 328→signal line 333→signal line 337; signal line 338→signal line 320+signal line 336→signal line 326→signal line 325; and signal line 338→signal line 320+signal line 339→signal line 326→signal line 334→signal line 337.

Referring back to FIGS. 3A and 3B, the arrangement of an image area separator of the reader unit 200 is described below.

By using the output 8-bit signals R, G, and B from the variable magnification processor 205, a color detector 226 detects whether the color of the image data is black or some other color. Subsequently, a character detector 227 detects whether the image data represents a character. A color detection signal ($Z_0$) and a character detection signal ($Z_1$) thus obtained are temporarily stored in a memory (Z) 229 via a memory data controller 228 of a memory unit 232. The control of the memory (Z) 229 is performed by a memory address controller 230.

In performing masking UCR processing, an image area separator 225 performs the following processing operations for a black character, a color character, and a halftone image (including dots) on the basis of the two determination signals described above, i.e., the color detection signal ($Z_0$) and the character detection signal ($Z_1$).

(1) Black character

Min (C, M, Y) is used as video signal.

Subtractions are performed for data C, M, and Y in accordance with set values.

Addition is performed for data K in accordance with a set value.

Edge emphasis is performed.

Data is printed out with 400 lines (400 dpi).

Residual color removal is performed.

(2) Color character

Edge emphasis is performed.

Data is printed out with 400 lines (400 dpi).

(3) Halftone image

Data is output by smoothing processing (in units of two pixels in the main-scan direction).

Data is output by through output.

These two processes can be selectively performed.

Since the color detector 226 and the character detector 227 discussed above have different image signal systems and different delay amounts, the memory address controller 230 adjusts the output timings of the respective detection signals $Z_0$ and $Z_1$.

A method of storing image data in the memory unit 208 or reading out the data from it will be described below in order of paths ①, ②, and ③ in FIGS. 3A and 3B.

In path ①, upon selection of the A input by a bus selector 218, the CMY image data subjected to the LOG conversion by the LOG converter 206 are directly output to a memory data controller 219 (at this time, it makes no difference what the output K is). The image data C, M, and Y thus supplied are stored in a memory (C) 220, a memory (M) 221, and a memory (Y) 222, respectively. In this case, these image data of each different color are stored in addresses (the same for all of the colors upon storage) given by a memory address controller 224. Note that any data can be fed to a memory (K) 223 at that time.

Figure 8:
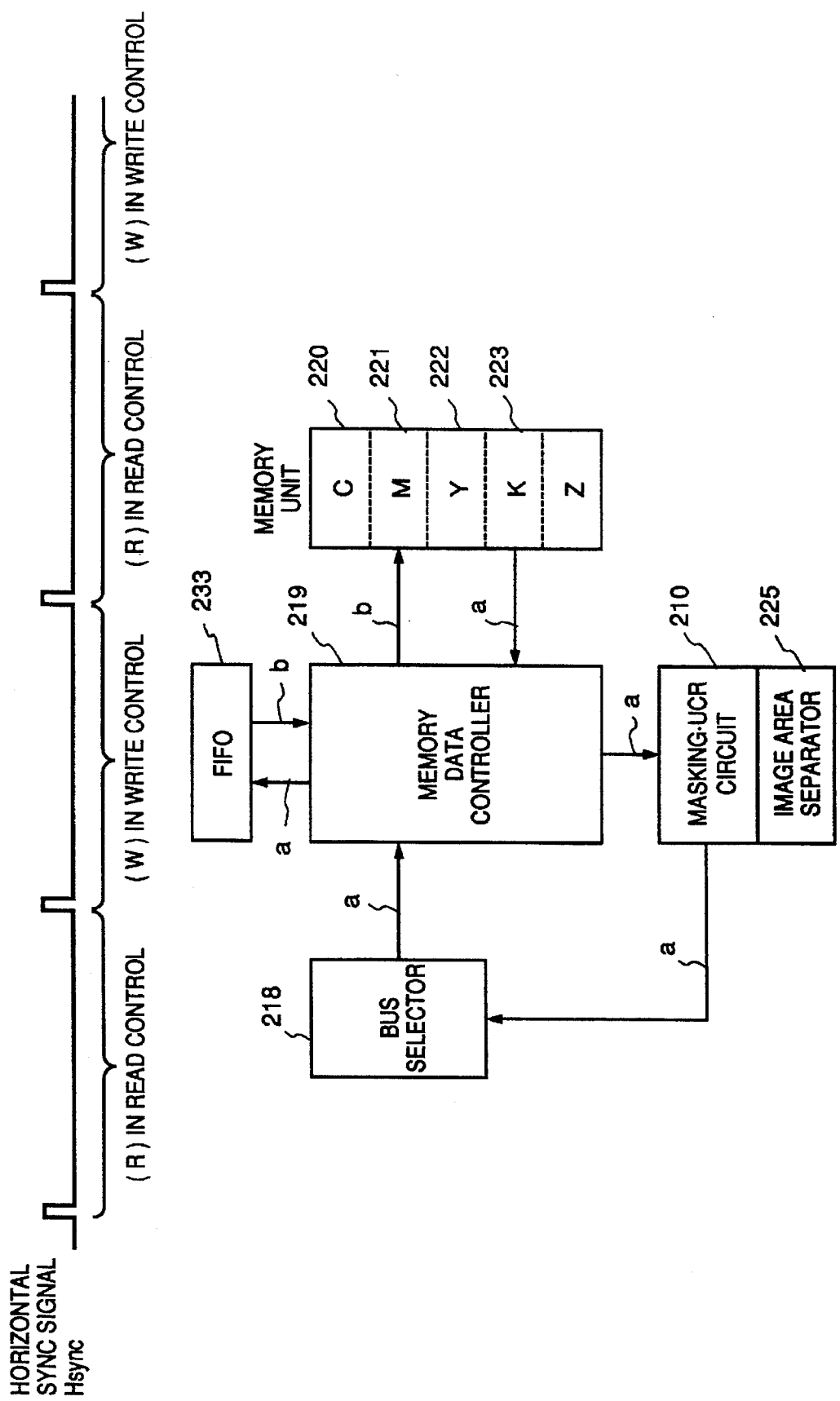
FIG. 8 is a block diagram showing read/write control of a memory data controller in FIGS. 3A and 3B.

In path ②, the masking•UCR circuit 210 and the image area separator 225 perform masking for the CMY image data read out from the memories 220 to 222. Subsequently, the bus selector 218 selects the B input, and the masked image data CMYK are input from the input B of the bus selector 218. The input data are directly output and again stored in the memories 220 to 223 this time as image data CMYK. In this system, these memories cannot be subjected to read and write accesses at the same time. Therefore, in read control (R) illustrated in FIG. 8, for example, output image signals from the memories CMY 220 to 222 are masked and temporarily stored line-by-line in a line memory (FIFO) 233, as indicated by arrows a in FIG. 8. In write control (W), these signals are again fed to the memories CMYK 220 to 224 along arrows b in FIG. 8. These operations are alternately repeated line-by-line. During the operations, the color detection signal $Z_0$ and the character detection signal $Z_1$ required in the processing performed by the image area separator 225 are also read out from the memory (Z) 229 as needed.

In path ③ in FIGS. 3A and 3B, the image data are read out from the memories CMYK of the memory unit 208 in synchronism with the timing of the drums CMYK of the printer. The readout data pass through the memory data controller 219 and are supplied to the γ-correcting circuit 211 through the masking•UCR circuit 210 and the image area separator 225, i.e., without being masked by these circuits.

In the above processing, the system of path ② is used for masking in place of path ① for the reason explained below. That is, since in this embodiment window processing is used in the color detection and the character detection discussed earlier, a considerable delay is generated in each detection signal with respect to an input image signal. Consequently, if masking and image separation are performed prior to storage into the memory, the image signal must wait for the delay time of the color detection signal and the character detection signal, and so a delay memory is required to cancel out this delay time. In path ②, the delay is absorbed by controlling the offset of the addresses of the memories 220 to 223 and the memory 229.

Also, masking is performed in path ② in place of path ③ for the following reason. In the 4-drum printer arrangement as described above, image data are constantly read out from the drums C, M, Y, and K at the respective timings. Consequently, four systems of CMY image data before being masked are read out simultaneously. In this memory access method, a memory chip which is being write-accessed by one system cannot be read-accessed by another system. Also, a controller for such control is significantly complicated. Additionally, the method suffers the disadvantage of being unable to decrease the number of memory chips from a certain fixed number even if the capacity of each chip is increased.

The arrangements of the memory units 208 and 232 is described below. As illustrated in FIGS. 3A and 3B, the memory units 208 and 232 consist of interchangeable memories (DRAM modules) 220 to 223 and 229, the memory address controllers 224 and 230 for controlling the addresses of these memories, and memory data controllers 219 and 228 for controlling the data of the memories. In a write operation, data from the bus selector 218 to the memory unit 208 are stored in the memories 220 to 223 via the memory data controller 219. In a read operation, data read out from the memories 220 to 223 are supplied to the masking•UCR circuit 210 via the memory data controller 219.

Figure 9:
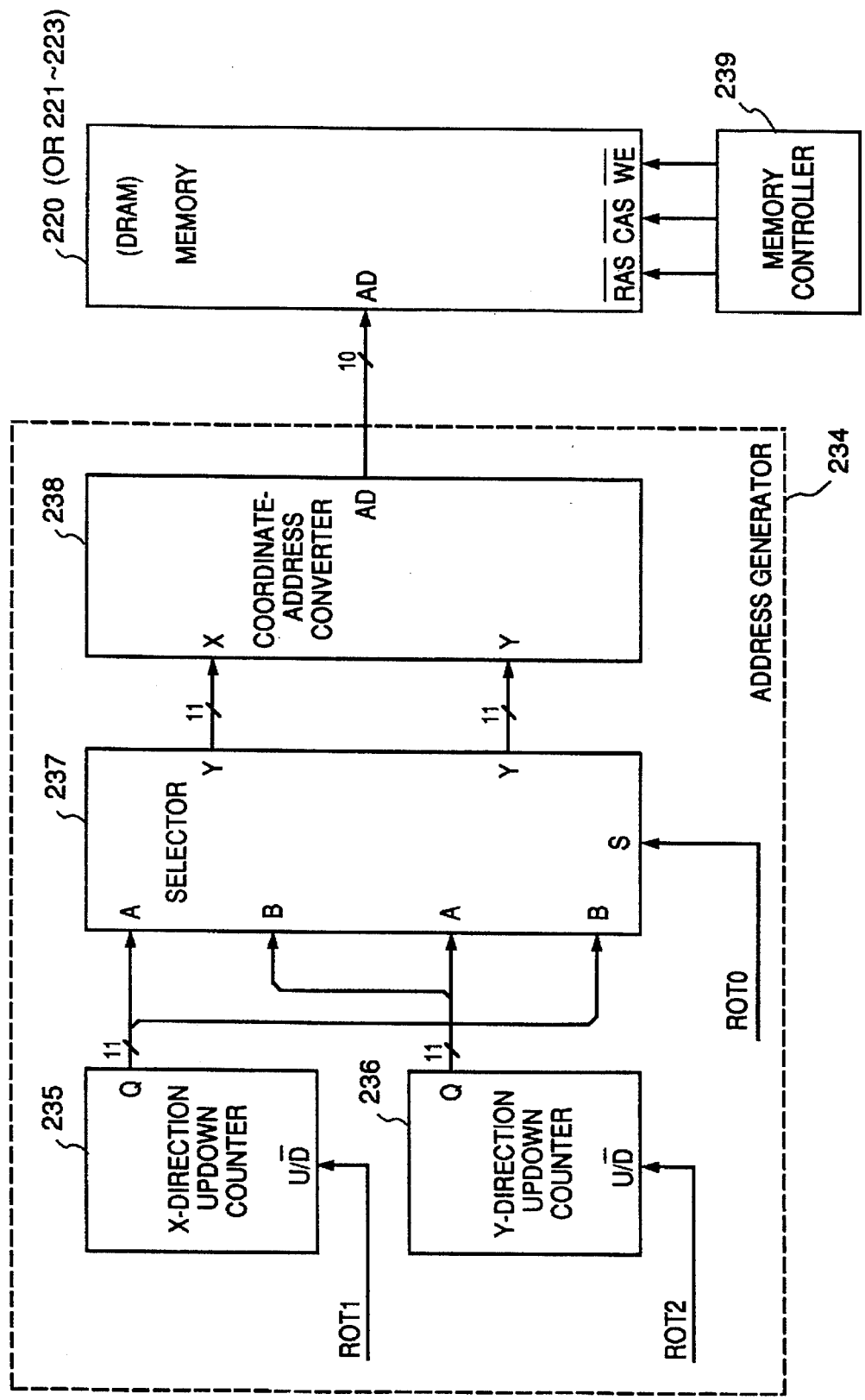
FIG. 9 is a block diagram showing the arrangement of a memory address controller in FIGS. 3A and 3B.
Figure 10A:
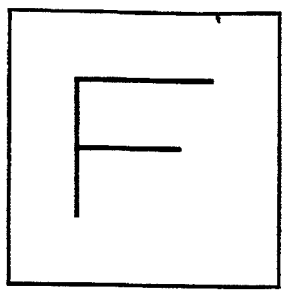
FIGS. 10A to 10H are views showing images upon rotation.
Figure 10B:
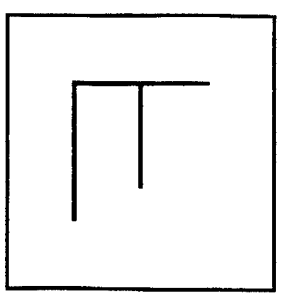
Figure 10C:
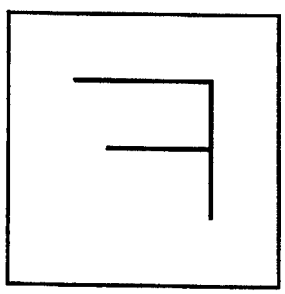
Figure 10D:
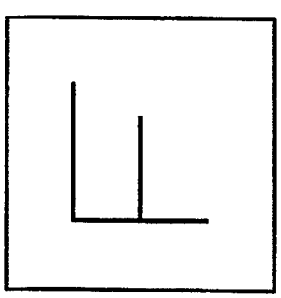
Figure 10E:
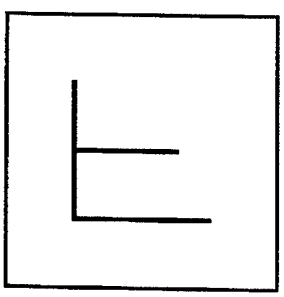
Figure 10F:
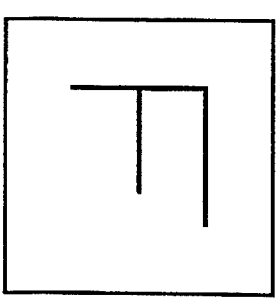
Figure 10G:
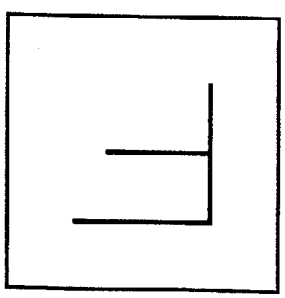
Figure 10H:
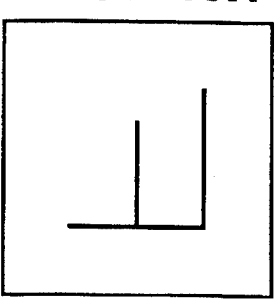

The memory address controller 224 has four of a circuit as illustrated in FIG. 9. Each of the four circuits is connected to the corresponding one of the memories 220 to 223. The memory address controller 224 also includes an address generator 234 and a memory controller 239. The address generator 234 is constituted by an updown counter 235 in the main-scan direction (X direction), an updown counter 236 in the subscan direction (Y direction), a selector 237 for switching the outputs from these counters, and a coordinate-address converter 238 for converting the output from each counter into an address of the memory 220 (a DRAM in this arrangement, but the memory may be some other device). Assuming the select signal from the selector 237 for switching the outputs from the counters 235 and 236 is ROT0 and the updown switching signals of the X- and Y-direction counters 235 and 236 are ROT1 and ROT2, respectively, 8 types of images as shown in FIGS. 10A to 10H are output by using the resulting 3-bit signal.

The memory controller 239 generates, e.g., RAS, CAS, and WE signals (all of which are low-active signals). The memory controller 239 uses these signals to determine which memory chip is to be accessed if a plurality of memory chips are used, or to select read or write.

Figure 11:
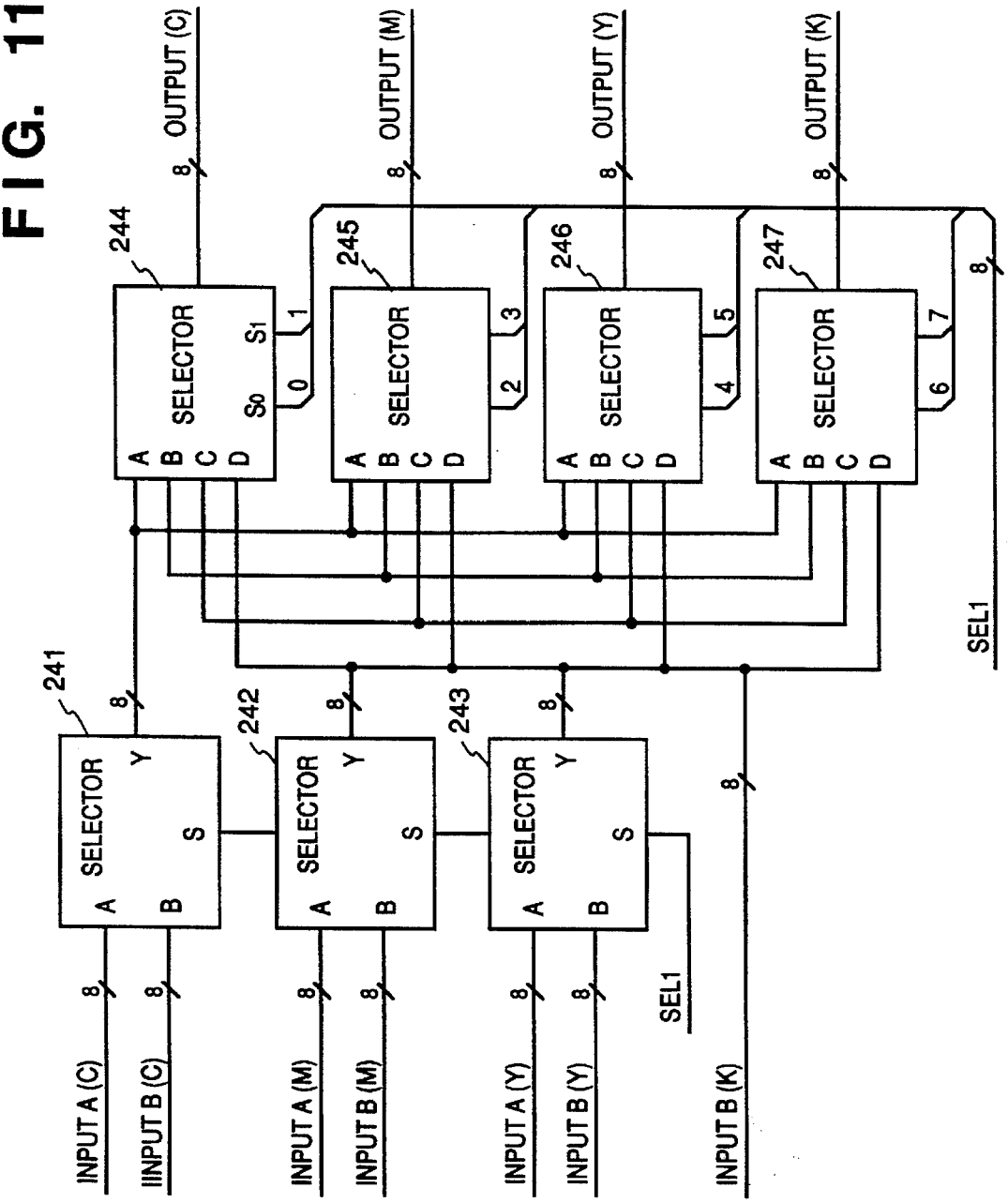
FIG. 11 is a block diagram showing the arrangement of a bus selector in FIGS. 3A and 3B.
Figure 12:
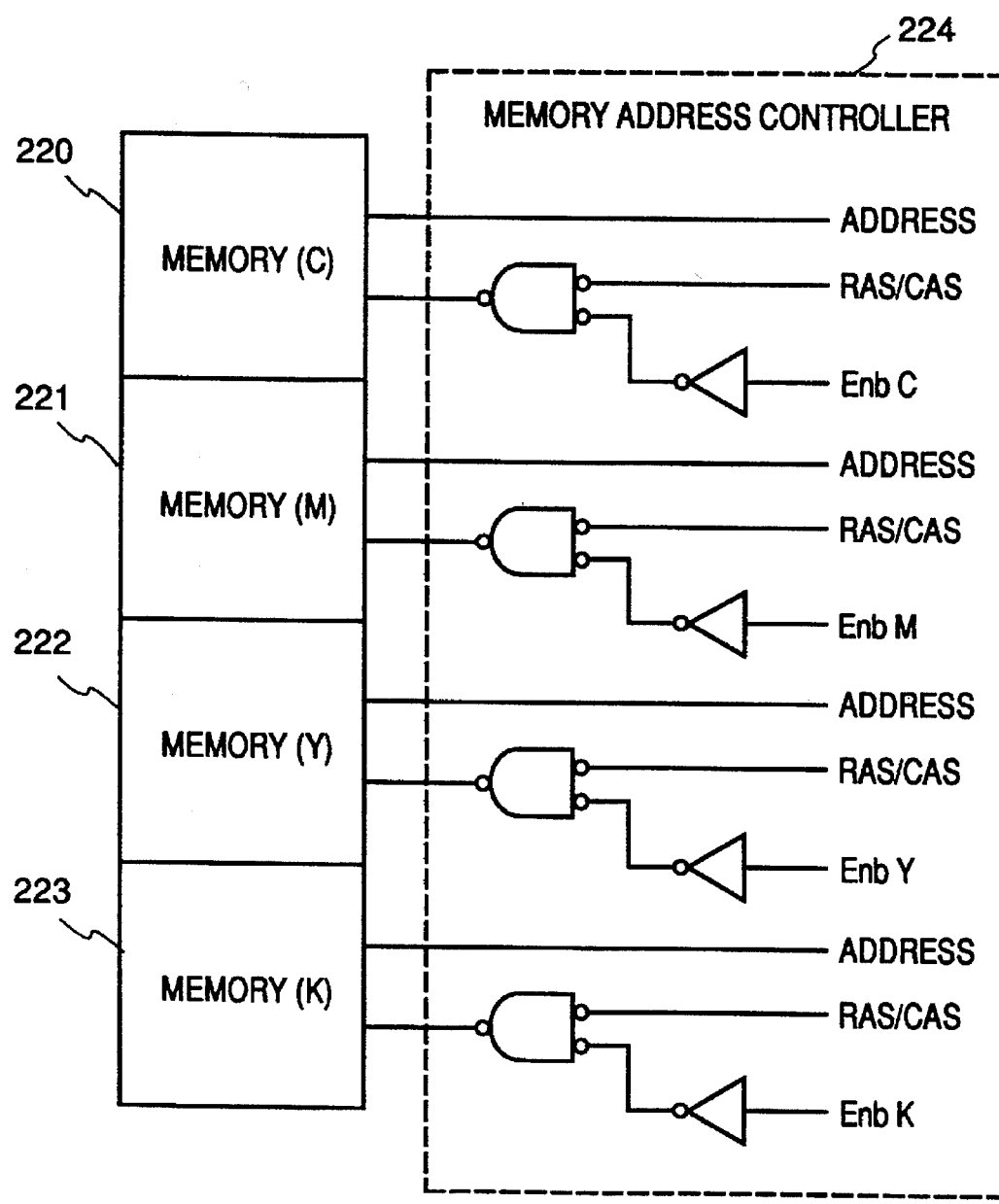
FIG. 12 is a view showing enable control of the memory address controller in FIGS. 3A and 3B.

Assume that 8-bit signals of three colors R, G, and B are supplied in a frame-sequential manner from external equipment such as a computer. As an example, assume image data is supplied in the order of R→G→B by using only the 8-bit signal line of R. The input image data from the external I/F 214 in FIGS. 3A and 3B is supplied to the bus selector 218 via the bus selector 217, the input masking circuit 204, the variable magnification processor 205, and the LOG converter 206. In this case, only C (cyan) is input to the bus selector 218. The bus selector 218 selects the A input at that time, since the internal arrangement of the bus selector 218 is as illustrated in FIG. 11 and since a select signal SEL1 of first selectors 241 to 243 is "0". Also, since a select signal SEL2 of second selectors 244 to 247 is "00"H, the signal C (cyan) of the A input is output to all of the outputs. Regardless of which of data R, G, and B is supplied, the same data is output to the outputs C, M, Y, and K of the bus selector 218 and supplied to the memory data controller 219. In response to the R, G, and B signals supplied in a frame-sequential manner, the memory address controller 224 performs control such that the signals are stored in sequence in the memories 220 to 223. More specifically, as shown in FIG. 12, in writing in the memory (C) 220, the memory address controller 224 controls the addresses such that EnbC=1 and EnBM=EnbY=EnbK=0. Likewise, in writing in the memories (M), (Y), and (K), control is performed such that EnbM=1, EnbY=1, EnbK=1, and the remaining address is "0". Consequently, the signals are sequentially written in the respective corresponding memories. Note that in the case of frame-sequential transfer of RGB, nothing is written in a memory (K) 179 in path ①.

In path ②, masking is performed by setting SEL1=1 and SEL2=E4H (i.e., output C=input C, output M=input M, output Y=input Y, and output K=input K) in the bus selector 218, FIG. 11. Thereafter, the images are output in path ③ in the way discussed above.

When a plurality of image forming apparatuses as described above are connected by a tandem system, the output image data from the interface device 1008 is simultaneously received by these image forming apparatuses.

The image forming apparatuses may simultaneously perform the above-mentioned image processing and simultaneously print out the results. This makes it possible to increase the apparent copying speed in proportion to the number of apparatuses.

Consider a case in which 8-bit image data of three colors R, G, and B are simultaneously input from external equipment such as a computer. First, the input RGB image data from the I/F 214 pass through the input B of the bus selector 217 and are stored in the memories 220 to 223 in the same fashion as discussed above.

At this time the memory address controller 224 controls write accesses to the memories by setting SEL1=0 and SEL2=E4H in the bus selector 218, FIGS. 3A and 3B, so that the data C, M, and Y are stored in the respective corresponding memories. More specifically, the image data are simultaneously written in the memories (C), (M), and (Y) by setting EnbC=EnbM=EnbY=1 and EnbK=0 in FIG. 11.

Thereafter, these data are masked and output as a color image from the printer unit 100 in the same manner as described above.

In this processing, a CPU (not shown) is already informed of whether the images are transferred in a frame-sequential manner from the external equipment or the images of three colors R, G, and B are transferred simultaneously from the external equipment, by the image transfer form command (code "09"), FIG. 6. With this command, the CPU can perform switching between the setting for frame-sequential transfer and the setting for 3-color simultaneous transfer.

In this embodiment as discussed above, in transferring color-separated image signals either frame-sequentially or simultaneously from external equipment, a high-speed output is made possible by temporarily storing the signals in memories and then outputting the signals from the same memories. Additionally, this permits a wide range of selection of a transmission form of the image data from external equipment and also improves the expandability of the apparatus. Furthermore, the operabilities of this apparatus and external equipment are improved by automatically switching the schemes of storage in the memories in accordance with the type of transmission form.

Moreover, it is possible to increase the apparent printing speed in proportion to the number of apparatuses by performing the above processing by the tandem system.

Consider next a case in which already masked CMYK image data are transmitted from external equipment via the external I/F 214.

The image data of C, M, Y, and K are supplied in a frame-sequential manner from the external I/F 214. At this time the LOG converter 206 is set in the through state (in which input data is directly output). Note that the LOG converter 206 is free to choose execution of LOG conversion or through output. As in the above embodiment, the image data are sequentially stored in the memories 220 to 223. The difference from the above embodiment is that black image data is also stored in the memory (K). Subsequently, image output is performed in path ③ without performing in path ②.

A CPU (not shown) is already informed of whether RGB image data or CMYK (or CMY) image data are to be transmitted, by the image transfer form command (code "09"), FIG. 6. In accordance with this command, therefore, the CPU selects one of LOG conversion and through output.

In addition, by sending information indicating which color is to be transferred by using this command, image signals can be transferred via the same interface regardless of the order of colors to be transferred. This widens the range of types of image data capable of being transferred from external equipment.

In the embodiment discussed above, the total memory capacity of the entire system is significantly large because each apparatus has an A3-size full memory. In the following embodiment, an image forming system is described in which at least one apparatus incorporating an A3-size full memory and a plurality of apparatuses each incorporating a compression memory capable of storing compressed images are connected.

That is, in this embodiment the operation of a tandem system is performed by stations consisting of a station A (1001) incorporating an A3-size full memory and stations B to D (1102 to 1104) each incorporating a compression memory, as shown in FIG. 13.

Figure 14A:
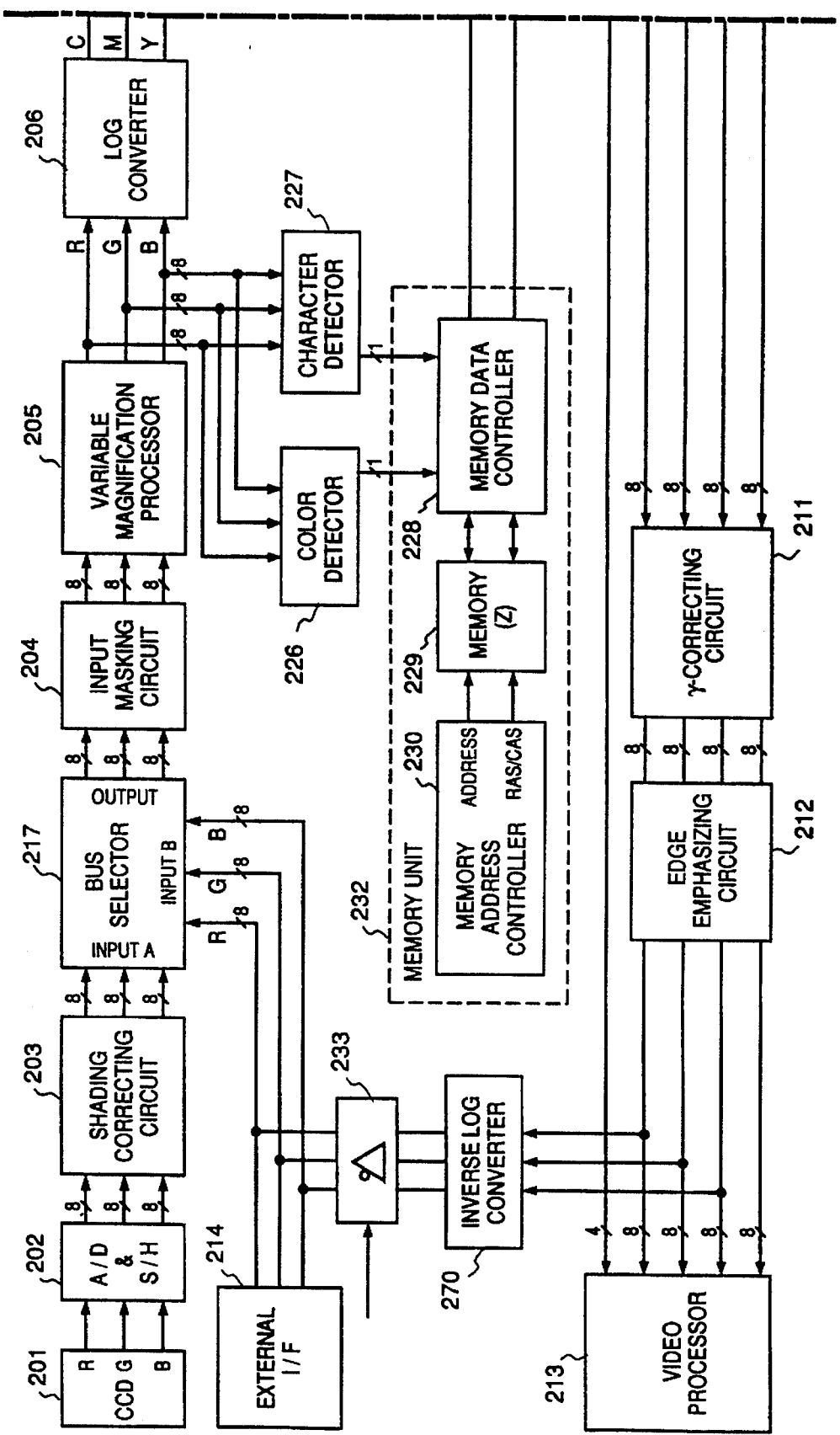
FIGS. 14A and 14B are block diagrams showing another arrangement of the image processing unit in the reader unit of the image forming apparatus used in the system in FIG. 12.
Figure 14B:
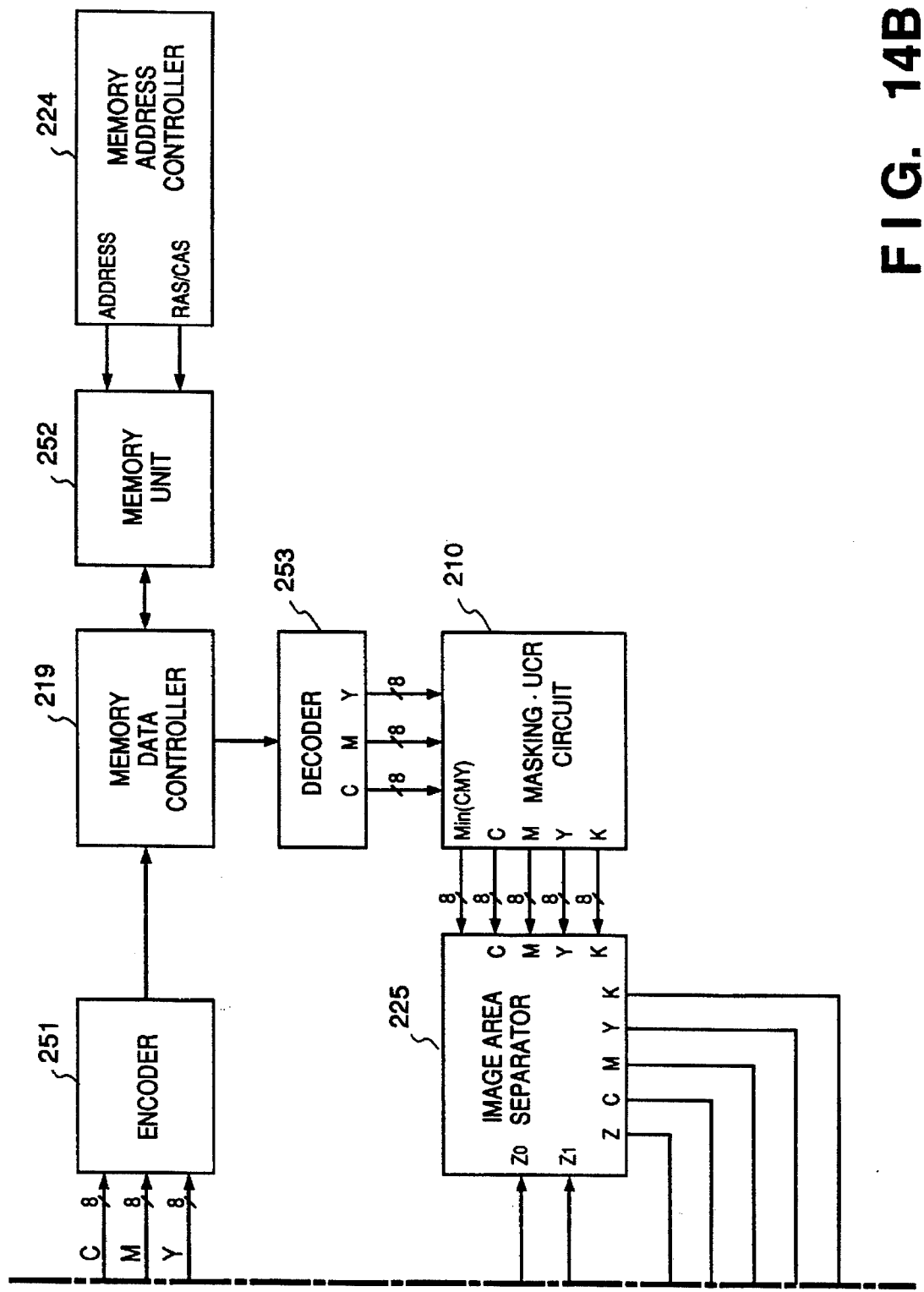

As illustrated in FIGS. 14A and 14B, each of the stations B to D (1102 to 1104) is an image forming apparatus which is different from those used in the above-mentioned embodiment in that an image processing system of a reader unit includes an encoder 251, a decoder 253, and a compression memory 252.

Compression encoding of image data A performed by the encoder 251 of the reader unit 200 in FIGS. 14A and 14B is described below.

Figure 15:
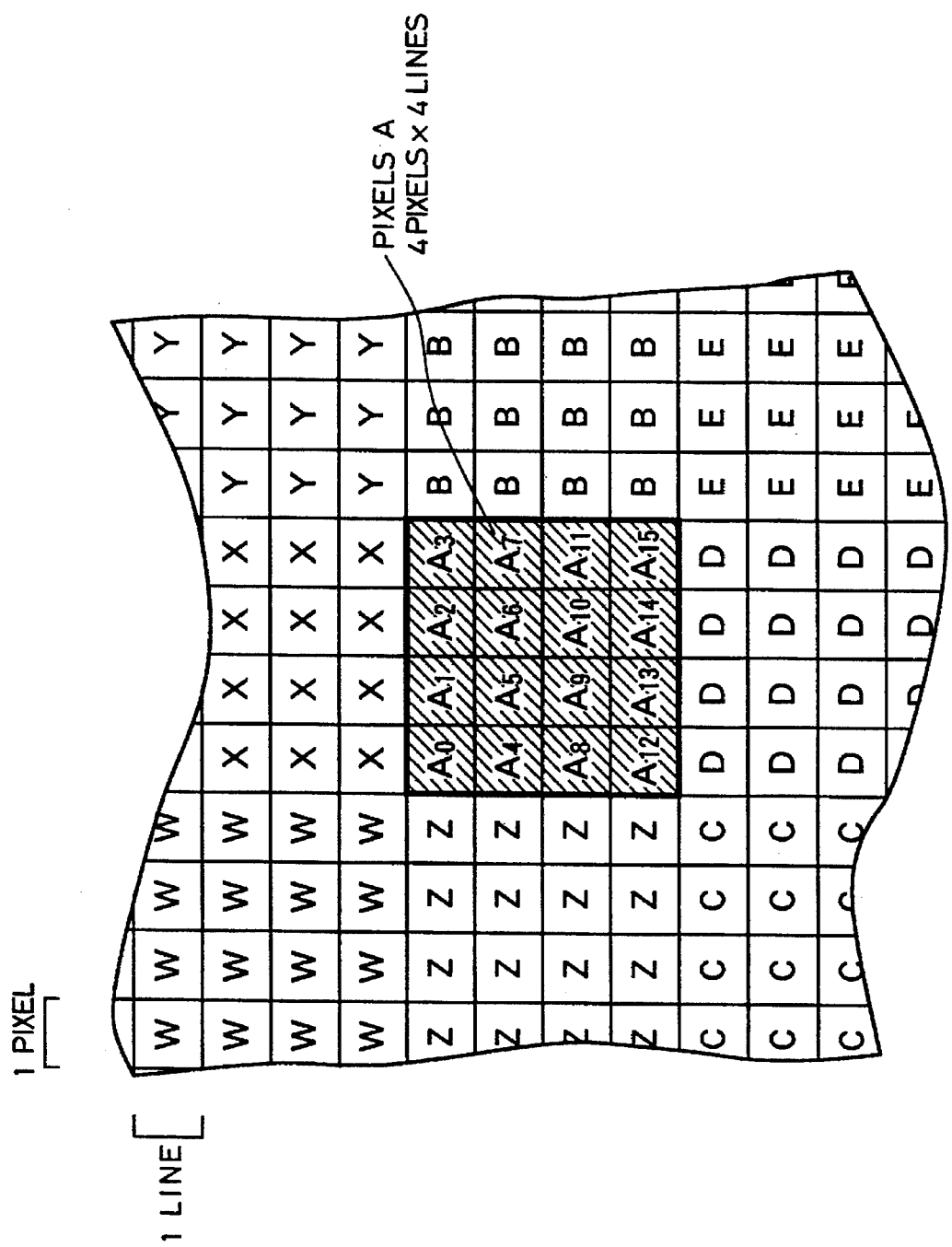
FIG. 15 is a view showing an image block to be data-compressed in the embodiment of the present invention.

In a diagram of 4 pixels×4 lines in FIG. 15, assume that the data amount of pixels A ($A_0$ to $A_{15}$) is to be compressed. In FIG. 15, each square corresponds to one pixel, and each pixel contains 8-bit image data of each of three colors, i.e., cyan (C), magenta (M), and yellow (Y). Image data of 4 pixels×4 lines, i.e., 16 pixels is defined as one block, and the amount of this image data of 1 block=16 pixels×3 colors×8 bits=384 bits is compressed by ⅙, thereby converting the data into a compressed code of a fixed length of 64 bits.

That is, the data compressor in this embodiment is a device which can perform compression well if image data of all of three color components C, M, and Y are available. One example of this compression is a method called a JPEG method.

Figure 16:
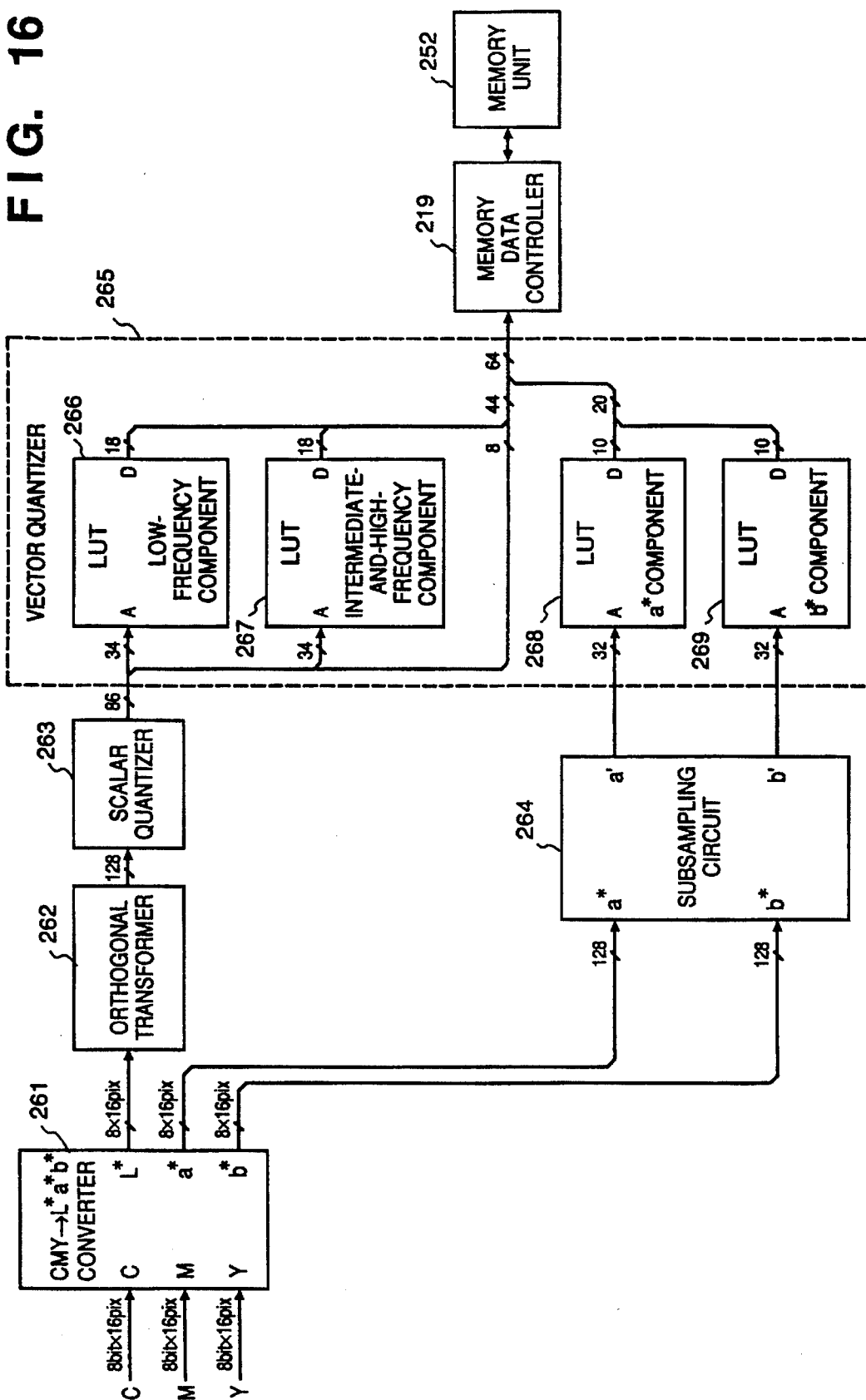
FIG. 16 is a block diagram showing the arrangement of an encoder unit in FIG. 13.

The arrangement of the encoder 251 for performing this image data compression encoding is shown in FIG. 16. In FIG. 16, 8-bit image data of each of three colors C, M, and Y is converted into a lightness component signal L* and chromaticity component signals a* and b* (8 bits each) by a CMY→L* a* b* converter 261. The lightness component signal L* is subjected to orthogonal transformation, such as DCT, in an orthogonal transformer 262 and is decreased in data amount from 128 bits to 86 bits by a scalar quantizer 263. The resulting signal is then quantized in units of frequency components by lookup tables (LUTs) of a vector quantizer 265. Consequently, an 18-bit low-frequency component is obtained by a LUT 266, and an 18-bit intermediate-and-high-frequency component is obtained by a LUT 267. Eight bits of the average value of the lightness component are added to these bits to yield coded data of a total of 44 bits.

On the other hand, each of the chromaticity component signals a* and b* is averaged in units of 2 pixels×2 lines by a subsampling circuit 264 and is thereby decreased in data amount from 128 bits to 32 bits. Thereafter, the signals a* and b* are encoded in units of 10 bits by an a*-component LUT 268 and a b*-component LUT 269, respectively, of the vector quantizer 265. Consequently, the image data A is stored in the memory unit 252 in units of 4 pixels×4 lines as a 64-bit compressed code Ac which combines the lightness-component and chromaticity-component coded data.

These steps of compression, storage, and expansion of image data are necessary for the reason explained below. That is, in a printer in which the positions of image formation units of individual colors differ from one another as illustrated in FIGS. 3A and 3B, the positions of image data on an image required by the individual image formation units are different at a certain given timing. The storage means is used as a delay means to compensate for this time difference. Also, compression and expansion are performed in order to decrease the capacity of the storage means by decreasing the image data amount.

The decoder 253 performs processing which is the inverse processing of the processing of the encoder 251 discussed above. The decoder 253 has four circuits (for C, M, Y, and K) in correspondence with the photosensitive drums of the respective colors. These four decoder circuits operate independently and simultaneously. The C, M, Y, and K decoder circuits of the decoder 253 read out the compressed code Ac at their respective timings. The code is expanded into image data of 3 colors×8 bits=24 bits for C, M, Y, and K by the C, M, Y, and K decoder circuits of the decoder 253 and masked by the circuits of the respective colors of the masking•UCR circuit 210. Consequently, 8-bit image data A' of each of C, M, Y, and K is restored (the image A is changed to the image A' due to compression distortion caused by quantization errors in the vector quantization or the like).

As described above, if the stations B to D have only compression image memories in order to decrease the memory capacity, the image compression and expansion steps are performed. In this case, the data compression is impossible unless image data of three colors R, G, and B (or C, M, and Y) are simultaneously input.

In these situations, therefore, the station A is defined as a master, and image data supplied in a frame-sequential manner are sequentially fed to the station A as CMY image data following the same procedure as in the above embodiment. These image data C, M, and Y are transferred intact in the CMY image data form to an inverse LOG converter 270 and returned to RGB data, and these data of three colors R, G, and B are simultaneously transferred to the stations B to D.

More specifically, the image data of three colors simultaneously output from the memory data controller 219 pass through the circuits from the masking•UCR circuit 210 to the edge emphasizing circuit 212 and are output from the external I/F 214 via the inverse LOG converter 270 and a tristate buffer 233. This tristate buffer 233 is controlled by a CPU (not shown).

At this time the stations B to D simultaneously receive the images of three colors R, G, and B supplied from the respective corresponding apparatuses. In each station, the images pass through the LOG converter 206 and are simultaneously compressed by the encoder 251. The compressed image data is stored in a memory having a capacity corresponding to the data amount after the compression.

In this case only the station A performs masking in path ②. When the stations A to D are ready to output, the tandem system performs image output operations simultaneously.

This control is performed as follows.

(1) A host apparatus designates tandem printing and a frame-sequential transfer mode as a data transfer mode.

(2) In response to this designation, only the station A receives data, and the stations B to D other than the station A do not perform this data reception.

(3) Wait until the station A completes the reception of the frame-sequential data.

(4) The data received by the station A are transferred in parallel to the stations B to D simultaneously.

(5) Tandem printing is started.

If the frame-sequential transfer mode is not designated in (1) of the above control, the station A need not transfer the data to the other stations.

In addition, the present invention can naturally be applied to an arrangement which is achieved by supplying programs to a system or to an apparatus.

In the embodiment as discussed above, color-separated image data can be input either sequentially in units of colors or simultaneously. This makes it possible to improve the facility of the apparatus and the system.

Additionally, the color-separated image data of each different color thus input can be simultaneously transferred to a plurality of apparatuses. Therefore, by providing the circuit for compressing/expanding the data amount of the image data in each apparatus, the memory capacity of the entire system is decreased while maintaining a high operability and a high CV.

In the above embodiment, the station A 1001 as a master station performs conversion from frame-sequential input to parallel output. However, the station A 1001 transfers externally input image data or read data directly to the stations B, C, D, . . . , without compressing the data.

Figure 17A:
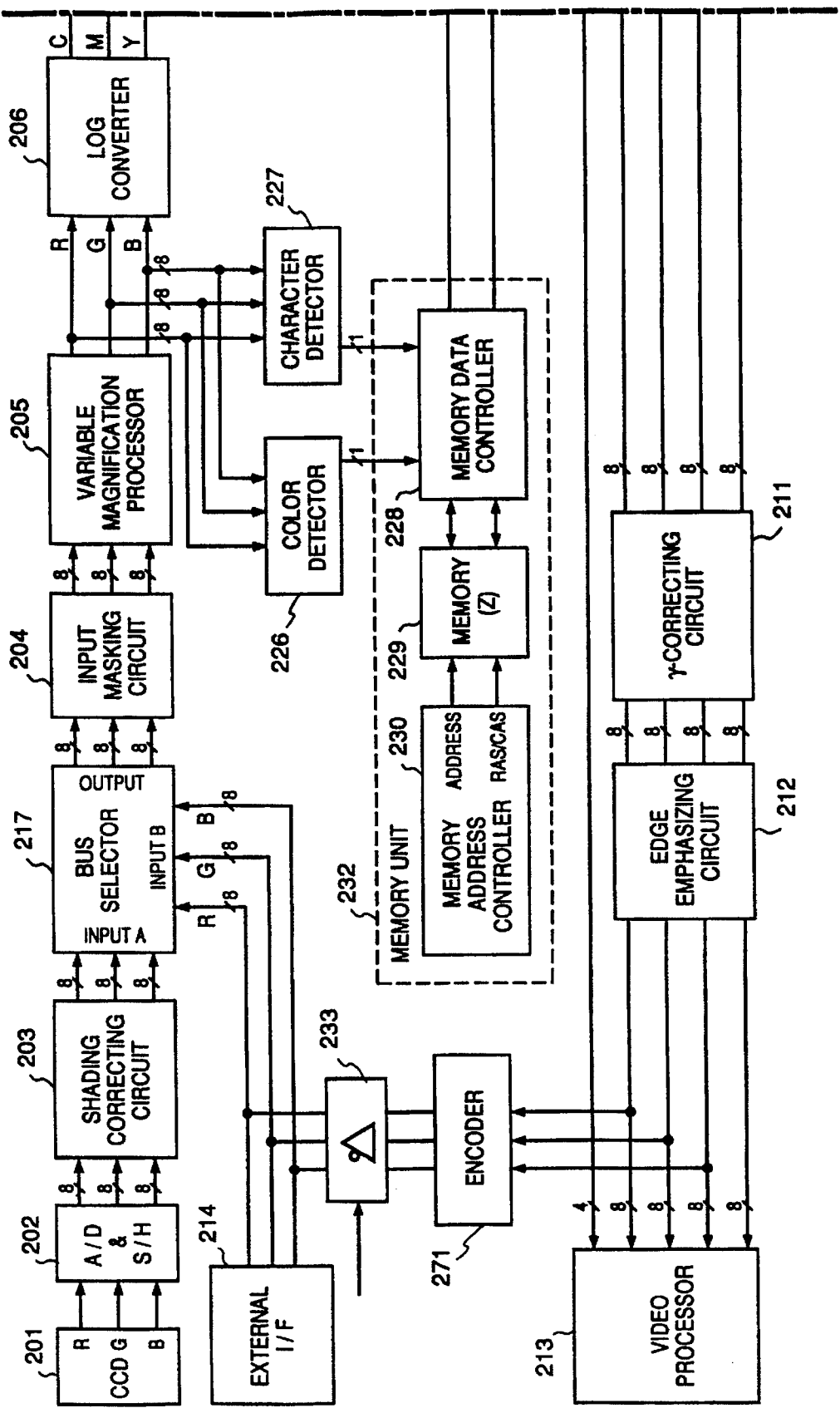
FIGS. 17A and 17B are block diagrams showing the arrangement of a master station A 1001 according to still another embodiment of the present invention.
Figure 17B:
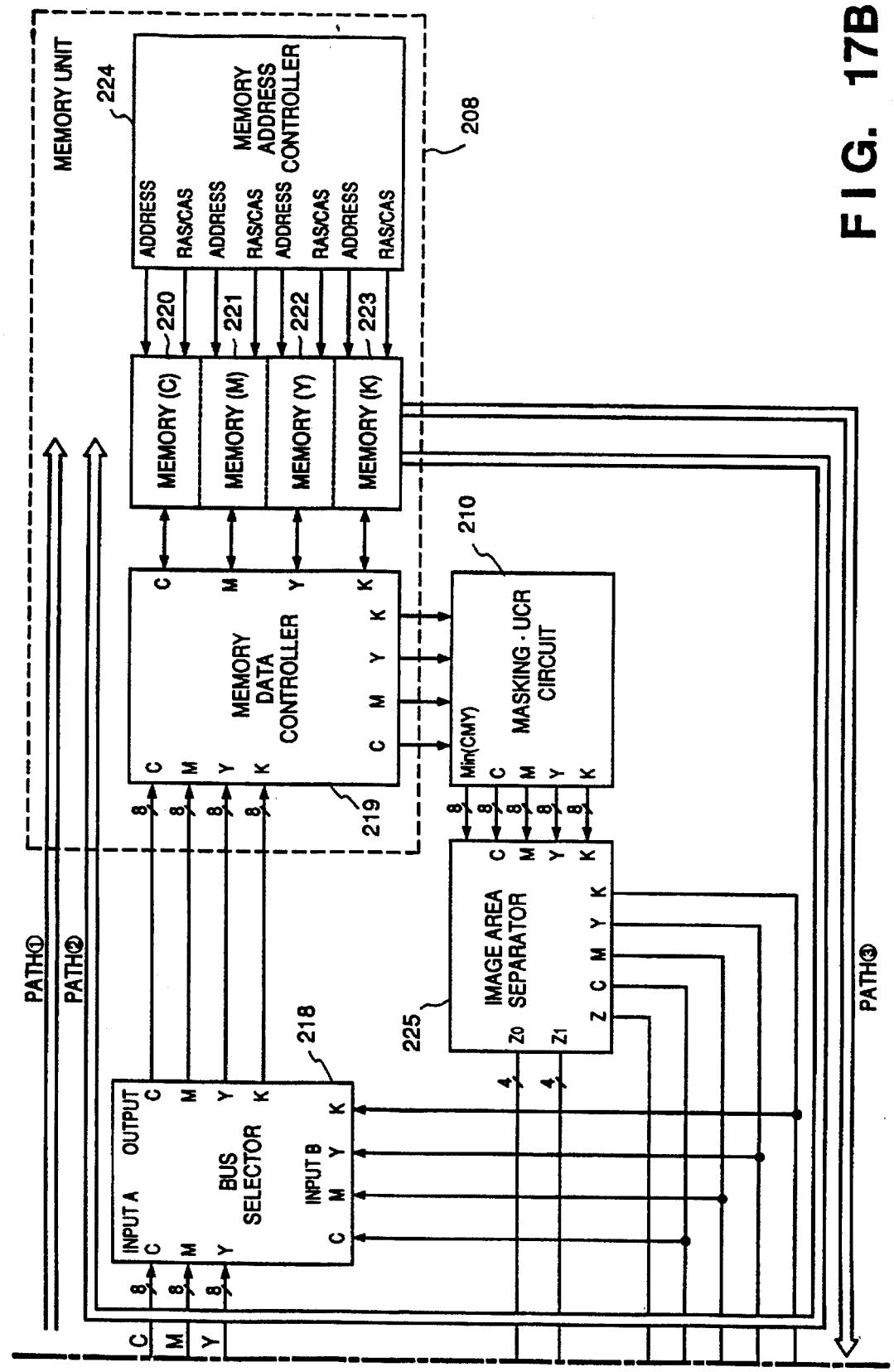

The present invention is not limited to the above embodiment. As an example, in outputting data of each different color in parallel from the master station, the master station can output the data to the slave stations after encoding the data by compressing the data amount. FIGS. 17A and 17B illustrate the arrangement of the master station A 1001 in this case.

In FIGS. 17A and 17B, CMY data stored in memories 220 to 222 by the processing in path ① pass through the circuits from a masking•UCR circuit 210 to an edge emphasizing circuit 212. The data are then subjected to compression encoding, as discussed above, performed by an encoder 271 and output.

In slave stations B to D, on the other hand, the data pass through the processing up to the encoder 251 in FIGS. 14A and 14B and are stored in a memory unit 252.

With this arrangement, the data amount transferred between the master and the slaves is decreased. This makes it possible to reduce the load on the transfer system or on each apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image forming system constituted by connecting a plurality of image forming apparatuses each for storing image data in storage means and forming an image, wherein a predetermined one of said image forming apparatuses comprises:

(a) input mean for inputting color-seperated image data of each different color in a sequential manner and for inputting in parallel the color-separated image data of each different color;

(b) storage means for storing the input image data input by said input means;

(c) data compressing means for data compressing the image data stored in said storage means; and (d) transfer means for transferring the image data compressed by said compressing means to said image forming apparatuses.

2. A system according to claim 1, wherein each of said image forming apparatuses except for said predetermined apparatus has expanding means for expanding the information amount of the compressed image data.

3. A system according to claim 1, wherein said predetermined apparatus has processing means for performing predetermined processing for the input image data and is capable of changing the processing in accordance with an input form of the input image data.

4. A system according to claim 3, wherein said input means also inputs additional information indicating a form of the image data, and said processing means changes the processing in accordance with the additional information.

5. A system according to claim 1, wherein said predetermined apparatus has memory connecting means for connecting an image memory unit, and said system can transfer image data read out from said image memory unit connected by said memory connecting means parallelly to said image forming apparatuses connected to said system.

6. An image forming apparatus usable in an image forming system constituted by connecting a plurality of image forming apparatuses each for forming an image, comprising:

(a) input means for inputting color-separated image data of each different color in a sequential manner and for inputting in parallel the color-separated image data of each different color;

(b) storage means for storing the input image data; and (c) data compressing means for data compressing the image data stored in said storage means; and (d) transfer means for transferring the image data compressed by said compressing means to said image forming apparatuses.

7. An apparatus according to claim 6, wherein said storage means includes a plurality of memories and memory control means.

8. An apparatus according to claim 7, wherein, when the image data of each different color are input in a frame-sequential manner, said storage means sequentially stores each image data into a corresponding one of said memories, and, when the image data of each different color are input parallelly, said storage means stores the image data parallelly into said memories and reads out the image data parallelly.

* * * * *

UNITED STATES PATENT AND TRADEMARK OFFICE
CERTIFICATE OF CORRECTION

PATENT NO. : 5,642,208

DATED : June 24, 1997

INVENTORS : HIROYUKI TAKAHASHI ET AL.   Page 1 of 3

It is certified that error appears in the above-identified patent and that said Letters Patent is hereby corrected as shown below:

ON TITLE PAGE

[56] References Cited U.S. Patent Documents

"Deg" should read ---Dea-- and insert --5,172,244 12/1992 Nakahara et al.; 5,150,454 9/1992 Wood et al.--.

COLUMN 2

Line 25, "FIG. 1 is a view" should read --Figs. 1A and 1B are views--; and
Line 53, "Fig. 13 is a view" should read --Figs. 13A and 13B are views--.

COLUMN 3

Line 27, "Fig. 1 shows" should read --Figs. 1A and 1B show--;
Line 32, "Fig. 1," should read --Fig. 1A,--; and
Line 44, "Fig. 1," should read --Fig. 1B,--.

COLUMN 4

Line 27, "oh" should read --on--.

UNITED STATES PATENT AND TRADEMARK OFFICE
CERTIFICATE OF CORRECTION

PATENT NO. : 5,642,208

DATED : June 24, 1997

INVENTORS : HIROYUKI TAKAHASHI ET AL.

It is certified that error appears in the above-identified patent and that said Letters Patent is hereby corrected as shown below:

COLUMN 5

Line 35,   "tray" should read --tray 118.--.

COLUMN 6

Line 21,   "Fig. 1." should read --Fig. 1A.--.

COLUMN 7

Line 1,    "Fig. 1" should read --Fig. 1A--.

COLUMN 8

Line 53,   "Fig. 1." should read --Fig. 1A.--.

COLUMN 9

Line 62,   "Figs. 1" should read --Fig. 1A--.

COLUMN 12

Line 15,   "BTCN8→X" should read --BTCN8←X--.

UNITED STATES PATENT AND TRADEMARK OFFICE
CERTIFICATE OF CORRECTION

PATENT NO. : 5,642,208

DATED : June 24, 1997

INVENTORS : HIROYUKI TAKAHASHI ET AL.

It is certified that error appears in the above-identified patent and that said Letters Patent is hereby corrected as shown below:

COLUMN 19

Line 32, "6F" should read --of--; and
Line 38, "Fig. 13." should read --Figs. 13A and 13B.--.

COLUMN 22

Line 9, "color-seperated" should read --color-separated-- and
Line 48, "and" should be deleted.

Signed and Sealed this

Tenth Day of February, 1998

Attest:

BRUCE LEHMAN

*Attesting Officer*  *Commissioner of Patents and Trademarks*